(12) United States Patent
Cohen et al.

(10) Patent No.: US 7,796,589 B2
(45) Date of Patent: Sep. 14, 2010

(54) COMMUNICATION PROTOCOL

(75) Inventors: Daniel C. Cohen, Newton, MA (US);
James S. Spitaels, Worcester, MA (US);
David A. Colucci, Stoneham, MA (US);
Matthew Fletcher Bush, Tyngsboro, MA (US); C. Michael Hoff, Boxborough, MA (US); Robert Joseph Backofen, Lowell, MA (US); Vishwas Mohaniraj Deokar, Nashua, NH (US)

(73) Assignee: American Power Conversion Corporation, W. Kingston, RI (US)

( * ) Notice: Subject to any disclaimer, the term of this patent is extended or adjusted under 35 U.S.C. 154(b) by 763 days.

(21) Appl. No.: 11/194,746

(22) Filed: Aug. 1, 2005

(65) Prior Publication Data

US 2007/0025347 A1    Feb. 1, 2007

(51) Int. Cl.
*H04L 12/28* (2006.01)
(52) U.S. Cl. .............. 370/389; 370/465; 370/466; 370/467; 370/546
(58) Field of Classification Search ............ 370/465, 370/466, 467, 389, 546
See application file for complete search history.

(56) References Cited

U.S. PATENT DOCUMENTS

| | | | |
|---|---|---|---|
| 4,506,324 A | | 3/1985 | Healy |
| 5,142,528 A | * | 8/1992 | Kobayashi et al. .......... 370/469 |
| 5,513,334 A | | 4/1996 | Alexander |
| 5,577,210 A | * | 11/1996 | Abdous et al. ............. 709/219 |
| 5,826,027 A | * | 10/1998 | Pedersen et al. ............ 709/221 |
| 5,968,136 A | | 10/1999 | Saulpaugh et al. |
| 6,088,796 A | * | 7/2000 | Cianfrocca et al. .......... 713/152 |
| 6,148,404 A | * | 11/2000 | Yatsukawa ..................... 726/2 |
| 6,424,119 B1 | | 7/2002 | Nelson |
| 6,445,088 B1 | | 9/2002 | Spitaels |
| 6,463,474 B1 | * | 10/2002 | Fuh et al. ..................... 709/225 |
| 6,639,383 B2 | | 10/2003 | Nelson et al. |
| 6,775,715 B2 | | 8/2004 | Spitaels |
| 6,865,685 B2 | | 3/2005 | Hammond |
| 7,003,676 B1 | | 2/2006 | Weber et al. |

(Continued)

FOREIGN PATENT DOCUMENTS

EP          596694 A1 *   5/1994

OTHER PUBLICATIONS

J. Postel, "Transmission Control Protocol", RFC 793 , Sep. 1981.*

(Continued)

*Primary Examiner*—Dang T Ton
*Assistant Examiner*—Robert M Morlan
(74) *Attorney, Agent, or Firm*—Lando & Anastasi, LLP

(57) ABSTRACT

One aspect relates to a communication protocol for communicating between one or more entities, such as devices, hosts or any other system capable of communicating over a network. A protocol is provided that allows communication between entities without a priori knowledge of the communication protocol. In such a protocol, for example, information describing a data structure of the communication protocol is transferred between communicating entities. Further, an authentication protocol is provided for providing bidirectional authentication between communicating entities. In one specific example, the entities include a master device and a slave device coupled by a serial link. In another specific example, the communication protocol may be used for performing unbalanced transmission between communicating entities.

47 Claims, 18 Drawing Sheets

U.S. PATENT DOCUMENTS

| | | | |
|---|---|---|---|
| 7,054,332 B2 * | 5/2006 | Favichia et al. | 370/466 |
| 7,082,541 B2 * | 7/2006 | Hammond et al. | 713/300 |
| 7,111,050 B2 | 9/2006 | McAdams | |
| 7,114,098 B2 | 9/2006 | Hammond | |
| 7,148,796 B2 | 12/2006 | Joy | |
| 2002/0091757 A1 * | 7/2002 | Cuomo et al. | 709/203 |
| 2002/0140819 A1 * | 10/2002 | Waehner et al. | 348/207.1 |
| 2003/0133574 A1 | 7/2003 | Caronni et al. | |
| 2003/0184794 A1 * | 10/2003 | Stringham et al. | 358/1.15 |
| 2004/0088541 A1 * | 5/2004 | Messerges et al. | 713/156 |
| 2005/0071444 A1 * | 3/2005 | Motoyama | 709/223 |
| 2005/0071568 A1 | 3/2005 | Yamamoto et al. | |
| 2005/0157660 A1 * | 7/2005 | Mandato et al. | 370/254 |
| 2007/0025347 A1 | 2/2007 | Cohen et al. | |
| 2007/0028104 A1 | 2/2007 | Cohen et al. | |

OTHER PUBLICATIONS

J. Postel "The TCP Maximum Segment Size and Related Topics", RFC 879, Nov. 1983.*

J. Zweig et al, "TCP Alternate Checksum Options", RFC 1146, Mar. 1990.*

T. Dierks et al, "The TLS Protocol", RFC 2246, Jan. 1999.*

R. Recio et al., "An RDMA Protocol Specification", Oct. 2002.*

Intel Corporation, Preboot Execution Environment (PXE) Specification, Version 2.1, Sep. 1999.*

A. Romanow, and S. Bailey, "An Overview of RDMA over IP," Proceedings of the First International Workshop on Protocols for Fast Long-Distance Networks (PFLDnet 2003), Feb. 2003.*

P.W. Hutto, Slow Memory: Weakening Consistency to Enhance Concurrency In distributed Shared Memories; IEEE, May 28-Jun. 1, 1990, pp. 302-309.

Office Action dated Dec. 26, 2008 from U.S. Appl. No. 11/194,504.

Final Office Action dated Sep. 14, 2009 from U.S. Appl. No. 11/194,504.

Office Action dated Dec. 22, 2009 from U.S. Appl. No. 11/194,504.

Final Office Action dated Jun. 21, 2010 from U.S. Appl. No. 11/194,504.

* cited by examiner

| Row | Data | | | | | | | |
|---|---|---|---|---|---|---|---|---|
| | Byte 0 | Byte 1 | Byte 2 | Byte 3 | Byte 4 | Byte 5 | Byte 6 | Byte 7 |
| 0 | 0x0000 | 0x0001 | 0x0002 | 0x0003 | 0x0004 | 0x0005 | 0x0006 | 0x0007 |
| 1 | 0x0008 | 0x0009 | 0x000A | | | | | |
| 2 | | | | | | | | |

Figure 15

| Offset | Description | Notes |
|---|---|---|
| 0x00 | Micro-Link Version | Identifies the version of the protocol being used |
| 0x01 | Row length | The transmission packet size for communications to this device |
| 0x02 | Number of Rows | The number of rows contained in the memory map |
| 0x03 | Unique Model Number (MSB) | A unique identifier for each model |
| 0x04 | Unique Model Number (LSB) | |
| 0x05 | Unique data table configuration | Identifies the version of the configuration of the Micro-Link memory |
| 0x06 | MicroLink Protocols Implemented | Bit 0 - MicroLink Open Protocol<br>Bit 1 - MicroLink Proxy Protocol<br>Bit 2 - MicroLink Private Protocol<br>Bit 3 - MicroLink Self Describing Record is appended after header (Proxy Header is included before the self describing record)<br>Bit 4 - MicroLink Bootload Protocol |
| 0x07 | Future Use | |

Figure 17

COMMUNICATION PROTOCOL

FIELD OF THE INVENTION

The invention relates generally to communications, and more specifically to a communication protocol for communicating between network entities.

BACKGROUND OF THE RELATED ART

There are many different types of protocols for communicating between network entities, such as computer systems coupled to a communications network. Such networks may be, for example, point-to-point networks, shared networks such as busses, or any other media or network configuration type. To communicate, two entities (e.g., computer systems, devices, hardware, and/or software) need to use and support the same or similar communication protocol. As communicating entities change and grow in features and complexity, there is an ever-present need to support additional protocols between them to accommodate changes of the communicating devices, user interfaces and of the communication media between them.

Advances in technology have brought a proliferation of devices which can read and gather data from many different sources. Devices can remotely monitor parameters including temperature, traffic, weather, bridge stress, power problems, water leaks, alarm conditions, stock quotes, and others. These devices generally exist as stand-alone sensors or as small elements within a larger system.

Similar advances in technology have produced a myriad of choices to present data gathered by such devices to users. Users can read gathered data on computer terminal screens, handheld computers, wireless telephones, portable sound players, luminescent orbs, highway signs and others. These devices all have attributes that lend themselves uniquely to one or more, but not all communication methods for sending and/or receiving data. Some communication methods involve some type of communication medium, including wireless, wired busses, wired point-to-point, optical, optical cable, and others. Such communication methods also involve some data transmission method or modulation referred to in the art as a communication protocol. Protocols used to send data across such media are even more plentiful. Examples include the well-known HTTP, SNMP, Ethernet, RS232, RS485, USB, RFID, Wi-Fi, IrDA, FSK, FM, and AM protocols, among others. There are many different communication methods involving different media and protocols, depending on the application.

According to one aspect of the present invention, it is appreciated that in many applications where many devices gather and send data to a much smaller group of listeners or users of data, there is a need to make the data gatherer smaller, less complex, to reduce overall system cost, while on the user's end there is a need to retain or increase the computing power in order to process and display the received data in a way that increases overall system usefulness.

Higher-level protocols typically used to transmit data, such as HTTP or Wi-Fi are common used in today's network and computing environments to transmit data. The advantage to using these methods for groups of many devices is that low-cost widely available software can read data in a common format and the data is made available to anyone with a personal computer or other widely available compatible hardware. However, one disadvantage of these higher-level protocols is that they require significant microprocessor resources, which increase the cost of the many devices deployed to gather data.

Current state of the art systems have subsystems gathering data, which either present their data to users in higher level protocols or present data to an intermediary system (proxy) using an extremely low level method (such as an analog signal). The disadvantages of the former subsystems are that they are expensive, having to support a higher-level protocol and they may become outdated as the high-level means and methods connecting them to their users changes. The disadvantages of the latter subsystems are that the information is subject to external interference and low performance rendering such systems useful for no more than simple sensors located close to the user of data or its proxy.

SUMMARY

According to one aspect of the present invention, a method for communicating between a first entity and a second entity is provided comprising acts of communicating, by the first entity, to the second entity, a message initiating communication between the first entity and the second entity, communicating, by the second entity, information stored in a public memory area of the master, the public memory area identifying a data structure of a communication protocol used to communicate with the second entity, and communicating, by the first entity, a message to the second entity using the information identifying the data structure. According to one embodiment of the present invention, information includes length information identifying a length of a data packet, and the method further comprises an act of communicating the message using a length indicated by the length information.

According to another embodiment, the information identifying the data structure includes version information relating to the communication protocol used to communicate with the second entity, and wherein the second entity identifies a communication protocol type used to communicate with the second entity based on the version information. According to another embodiment, the second entity performs an act of sending, to the first entity, data messages having different lengths. According to another embodiment, at least one of the data messages includes a write request, the write request including data necessary for performing the write request by the second entity.

According to one embodiment of the present invention, the method further comprises an act of determining, for each of the data messages, a checksum, and transmitting the checksum with each of the data messages. According to another embodiment, the act of determining a checksum further comprises an act of determining a Fletcher checksum.

According to another embodiment, the method further comprises an act of communicating, by the first entity, a request for access by a third entity to the second entity. According to another embodiment, the method further comprises an act of translating, by the first entity, the request to a format associated with the second entity. According to another embodiment, the information identifying the data structure further comprises dimension information, and the act of communicating, by the first entity, a message to the second entity using the information identifying the data structure, further comprises an act of accessing a portion of a memory of the second entity based upon the dimension information. According to another embodiment, the information identifying the data structure further comprises version information, and the act of communicating, by the first entity, a message to the second entity using the information identifying the data structure, further comprises an act of accessing a portion of a memory of the second entity based upon the version information.

According to one embodiment of the present invention, the message initiating communication between the first entity and the second entity is an acknowledgement message, and the first entity is adapted to send a plurality of acknowledgement messages to the second entity. According to another embodiment, the method further comprises an act of determining, by the second entity, based on a receipt of a predetermined number of acknowledgement messages that the first entity is in a state of initiating communications between the first entity and the second entity. According to another embodiment, the acknowledgement messages are negative acknowledgement messages. According to another embodiment, the method further comprises maintaining, by the second entity, a count of acknowledgement messages received from the first entity. According to another embodiment, the method further comprises an act of sending to the second entity, by the first entity, a plurality of consecutive acknowledgement messages. According to another embodiment, the method further comprises an act of send each of the consecutive acknowledgement messages after a timeout period.

According to one embodiment of the present invention, the method further comprises an act of communicating, by the second entity, the information identifying a data structure of the communication protocol used to communicate with the second entity in response to receiving a predetermined one of the plurality of acknowledgement messages. According to another embodiment, the information includes length information identifying a length of a data packet, and the method further comprises an act of communicating the message using a length indicated by the length information. According to another embodiment, the second entity is at least one of an Uninterruptible Power Supply (UPS) and a UPS component. According to another embodiment, the first entity is a manager of the at least one of the UPS and UPS component. According to another embodiment, the second entity is a master entity and the first entity is a slave entity. According to another embodiment, the first entity is a general purpose computer system. According to another embodiment, the method further comprises an act of relaying the request without decoding any data relating to the request.

According to one embodiment of the present invention, the message includes a header portion and a data portion. According to another embodiment, the method further comprises an act of receiving, by the first entity, the message from a third entity, and relaying the message to the second entity without decoding data located in the data portion. According to another embodiment, the header portion includes version information. According to another embodiment, the method further comprises an act of accessing, by the first entity, the public memory area. According to another embodiment, the second entity comprises a key and a private memory area, and wherein the method further comprises an act of accessing, by the first entity using the key, a private memory area of the second entity. According to another embodiment, the method further comprises an act of authenticating, by the second entity, the first entity to permit the act of accessing.

According to another embodiment, the method further comprises an act of sending, by the first entity, a signal to the second entity that causes the second entity to enter an alternate communication mode. According to one embodiment of the present invention, the method further comprises an act of performing a write request to the second entity causing the second entity to enter the alternate communication mode. According to another embodiment, the method further comprises an act of writing a value to a register of the second entity to cause the second entity to enter the alternate communication mode. According to another embodiment, the method further comprises an act of requesting, by the second entity, a boot file from the first entity. According to another embodiment the boot file includes checksum information, and the second entity performs an act of checking the boot file with the checksum information prior to loading the boot file. According to another embodiment, the checksum information includes a Fletcher checksum, and wherein the second entity performs an act of checking at least a portion of the boot file with the Fletcher checksum prior to loading the boot file. According to another embodiment, the key is determined based on information stored in the public memory area of the second entity. According to another embodiment, the method further comprises an act of authenticating, by the first entity, to the second entity on behalf of the third entity. According to another embodiment, the second entity includes a memory, and wherein the method further comprises acts of transmitting, by the first entity, a portion of the memory to the third entity.

According to one embodiment of the present invention, the act of transmitting the portion of the memory further comprises an act of sending the portion of the memory over a network to the third entity using a network transport protocol. According to another embodiment, the network transport protocol is the Simple Network Management Protocol (SNMP). According to another embodiment, the method further comprises an act of registering, by the first entity, the third entity as an authenticated entity. According to another embodiment, the third entity includes network identification information, and wherein the act of registering comprises an act of storing the network identification information in a memory of the first entity. According to another embodiment, the third entity is a client coupled to the first entity through a communication network. According to another embodiment, the act of relaying the message includes an act of sending the message to the client over the communication network using a network transport protocol. According to another embodiment, the network transport protocol is the Simple Network Management Protocol (SNMP). According to another embodiment, the second entity includes a private memory area, and wherein the method further comprises acts of determining, based on a portion of the public memory area, a key, and accessing the private memory area using the determined key.

According to another aspect of the present invention, a method for authenticating a system is provided. The method comprises acts of providing access to a public memory area including a first portion, and providing access to a private memory area based on a key determined based on the first portion of the public memory area. According to one embodiment of the present invention, the method further comprises an act of determining, based on the first portion of the public memory area, a value of the key. According to another embodiment, the act of determining further comprises an act of calculating a checksum of the first portion of the public memory area. According to another embodiment, the act of calculating further comprises an act of initializing the checksum with a value of the first portion of the public memory area. According to another embodiment, the act of providing access to the public memory area includes an act of sending, by a master, contents of the public memory area to a slave.

According to another embodiment of the present invention, the method further comprises an act of storing, by the slave, the contents of the public memory area in a memory of the slave. According to another embodiment, the act of sending the contents of the public memory area is performed in response to receiving a request from the slave. According to another embodiment, the method further comprises an act of determining a value of the key using at least one portion of the contents of the public memory area. According to another embodiment, the method further comprises an act of initializing a starting value of the key to the at least one portion. According to another embodiment, the at least one portion is indicative of a model number of the master. According to another embodiment, the at least one portion is indicative of a date of manufacture of the master. According to another embodiment, the method further comprises an act of translating, by the slave, an access request received from an entity to the request sent to the master. According to another embodiment, the method further comprises an act of determining, by the slave, whether the entity is authorized to access the master.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing.

In the drawings,

FIG. 15 is a table showing an example memory map according to one embodiment of the present invention;

FIG. 17 is a table showing an example header format according to one embodiment of the present invention;

DETAILED DESCRIPTION

Figure 1:
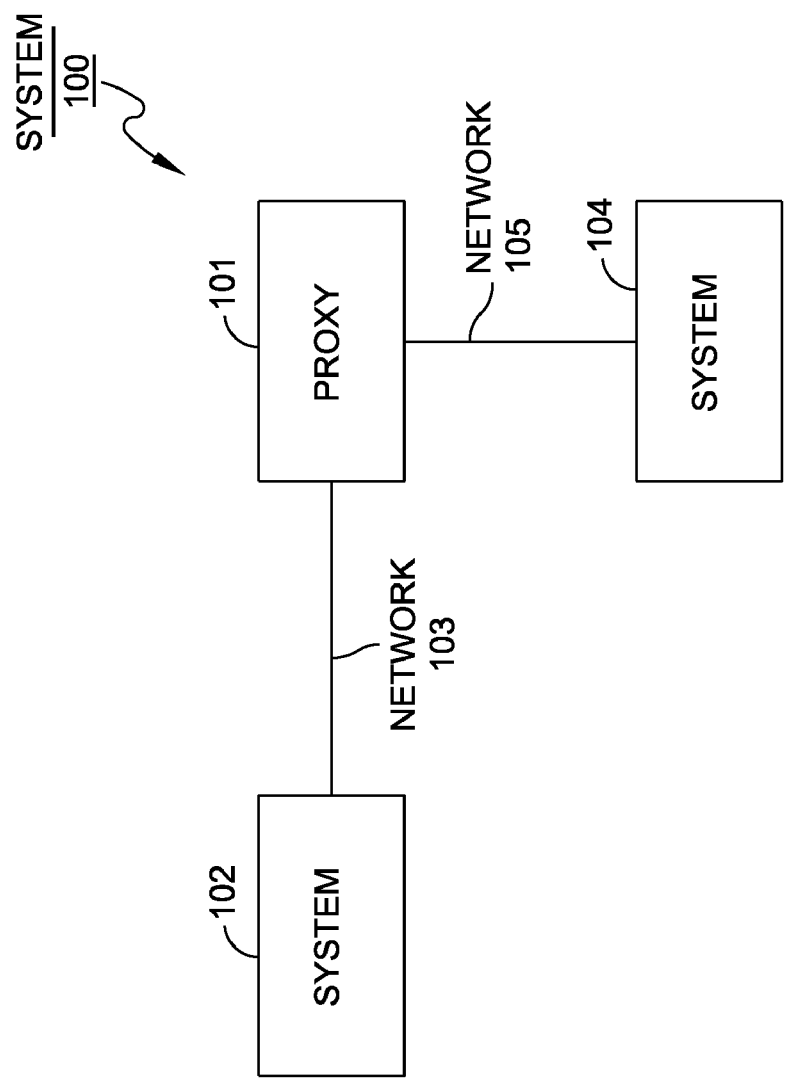
FIG. 1 is a block diagram of an example network system in which various aspects of the present invention may be practiced.

One aspect of the present invention relates to a communication protocol for communicating between one or more entities, such as devices, hosts or any other system capable of communicating over a network. According to one aspect of the present invention, it is appreciated that a protocol is desired for use in communicating information from many entities such as devices to a small number of users of data. According to specific aspects of the present invention, it is appreciated that there is a need for a communication subsystem that subsystem types that can operate in an application having the following attributes:

- In the particular application, there are many entities that gather data and control simple functions (e.g., devices that manage a power or cooling device). Such entities send data to a much smaller group of entities that process, manage and display this data to users or other systems.
- The simple data gatherers generate most of data, and most consumers of data have relatively small amounts of data to send back to the data generators. For example, in a typical control system, there are multiple inputs and a small number of outputs.
- Consumers of data generally prefer to use the same rules to communicate to multiple different sources of data, such as a web browser application loading web pages from different websites, or a building management interface that monitors a status of different types of systems in its domain such as HVAC, water and electrical distribution subsystems.

The subsystem architecture ideal for this application may have the following features and advantages:

- Where data is generated, a lower-cost device can be used to conduct the control functions, and send relevant data, using a simpler protocol, to other devices that can handle higher-level end-user communication protocols.
- Changes to the higher-level protocols, or the addition of new user-interfaces that employ new protocols do not require changing the many low-cost control processors' operating instructions and/or hardware.
- Information transmitted to and from the data sources reliably and securely support moderate control, management and monitoring of those remote subsystems.

To this end, according to one aspect of the present invention, a protocol is provided that allows communication between entities without a priori knowledge of data content and format being transmitted using the protocol. In such a protocol, for example, information describing a data structure of the communication protocol is transferred between communicating entities. This contrasts to conventional systems that need to know the protocols, commands and data structures of the devices with which they communicate before they begin to communicate.

In one example system according to one embodiment of the present invention, the data structure of a communication protocol is stored in a memory of a receiving entity, and the stored data structure is updated based on information received from a sending entity. According to one embodiment, the data structure is stored in both the sending and receiving entities. In a specific example, elements of the data structure may be modified by either entity.

In one embodiment, the data structure is described within a header of the received information. According to one example, the received information includes header information and device data. Such device data may include, for example, entity configuration and status data.

In a specific example, the header information includes version information that indicates a version of the data structure. The header information may also include dimension information indicating a dimension (e.g., a size) of a memory area of the transmitting entity. The receiving entity may update a copy of a memory map of the transmitting entity that includes the version and dimension information.

In one embodiment, the receiving entity is referred to as a "slave" because the slave learns the protocol used by a transmitting entity referred to as the "master." In particular, the slave may update its use of the protocol to match the use of the protocol of the master. In one example, the slave accesses a shared memory of the master to determine a data structure used by the master. According to one embodiment, the slave is capable of storing the data structure used by the master in a memory associated with the slave. The slave may then access the master using the received data structure information. For instance, the master may access other data stored in the master using previously-received data structure information. The data structure may define, as discussed, the version of the protocol and dimension information.

The dimension information may include, for example, a number of rows and a length of data within rows contained in the memory. In one example, the length of each row may correspond to a transmission packet size of data packets being sent. In one embodiment, a transmission packet size used to communicate information between two entities (e.g., the slave and the master) may be determined by the length information stored in the memory of the master. In one embodiment of the present invention, a slave may automatically determine the transmission packet size used to communicate to the master. In one example, at the start of communication between the master and slave, the slave communicates a message to the master and waits a timeout period for a response from the master. The master is adapted to send the data structure information including the transmission packet size to the slave upon receipt of the message. In one example, the message is a message having a fixed length. In another example, the message is a negative acknowledge message, and the master is adapted to send the data structure information upon receipt of a predetermined number of negative acknowledgement messages.

Because the slave can dynamically adapt itself to a number of different master types and versions, the slave is more adaptable to master devices and is more useful as a result. Such a feature may be beneficial, for example, in a management system that manages one or more devices (e.g., master devices). Further, the slave may be part of a proxy system that is capable of communicating with one or more systems, such as a management system. Also, because such a slave need not store multiple protocols to support multiple master types, the slave may be simplified and less costly as a result. More particularly, the cost for creating slave devices may be reduced, as the slave may be adapted to different master devices rather than being specially-manufactured for a single or limited number of master device types.

In one specific embodiment, one entity (such as the master) changes its stored version of the data structure more frequently than the other entity. For instance, in a monitoring and/or control system, a device may be adapted to update its copy of the data structure more frequently than systems that monitor the device. For instance, the device may be an uninterruptible Power Supply (UPS), a UPS component, environmental control system (e.g., an air conditioning system or component), or other type of monitoring and/or control device.

The slave may be, for example, a manager of the master (e.g., a device being monitored and/or controlled). In one example, the slave is implemented on a general-purpose computer system such as, for example, a personal computer (PC). For instance, the slave may be part of a PC used to manage the master, such as a monitoring and/or control device. As discussed, the slave may also be part of a system (e.g., a proxy) that acts as a relay that communicates data to/from other systems. To this end, entities communicating with a master may be directly connected to the master (e.g., via a serial link) or may be coupled through one or more intermediate systems and/or networks.

The shared memory of the master may include other information used by the slave to access the master. For example, the dimension information may also include an identifier that indicates a version of a data table format of information stored in memory of the master. A slave may use such an identifier to determine the format of data stored in memory of the master, any slave may therefore learn the format and usage of the master data as a result.

According to one aspect of the present invention, a protocol is provided that supports an unequal (or unbalanced) transfer of data between communicating entities. That is, the amount of data sent by one entity exceeds the amount sent by another entity. In one specific implementation, the protocol may provide the ability to communicate a majority of data from a master to a slave in a reliable manner. In one implementation, the slave is able to send data to the master, but at a reduced data rate as compared to the transmission rate of the master. According to one aspect of the present invention, it is realized that in particular applications such as monitoring of devices, a majority of data is sent by the devices being observed, and therefore, it may be beneficial to optimize a communication protocol maximize such a transmission scenario.

According to another aspect of the present invention, a protocol is provided that permits an entity to relay transmitted information without needing to understand or interpret the transmitted information. The information may be relayed, for example, to another entity such as a client system (e.g., by the proxy system as described above). In one example, the entity may be located on another network, and the intermediate entity (e.g., the proxy) transfers the information between different networks. In the example described above, a slave may be capable of determining communication parameters used for communicating to a master system.

In one aspect of the present invention, the slave system may be capable of relaying requests to the master from other entities. In one example, the slave need not interpret any data transferred between the master and other entity, but may translate requests received from another entity to the communication format required by the master. There may be defined a minimum set of information necessary for the slave system to communicate with the master, and to adapt its communication to permit other entities to access the master through the slave. Because a slave according to one embodiment is capable of communicating with a number of master systems having varying communication capabilities, and the slave is capable of translating requests to other entities, such a slave system may be useful in managing multiple system types. Such a management capability may be beneficial in a UPS having one or more managed components.

In one embodiment, the proxy is capable of supporting access and relating information to/from a master entity by more than one entity. For instance, a proxy having a slave capability may also be coupled to more than one other system (e.g., computer systems (e.g., clients) coupled to a communication network) for the purpose of managing the master entity from more than one system. To this end, the proxy may be capable of receiving multiple requests from different systems, and translate those requests to requests that may be executed on the master.

Also as discussed further below, the slave of the proxy is capable of performing an authentication function so that an authorized slave may communicate with a master. In the situation where multiple entities attempt to access a single master, the proxy may be adapted to support authentications of each of the accessing systems. In such a case, according to one embodiment of the present invention, the proxy system performs a check to determine whether the accessing systems have permission to perform one or more accesses (e.g., one or more read functions, write functions, control functions, etc.) to the master entity. If authenticated, the proxy communicates the access request to the master entity. If not, the access request is denied.

According to one embodiment of the present invention, an improved communication protocol is provided for effecting low-overhead or "lightweight" communication between entities, such as hardware controllers. Such a protocol may be used to communicate information between network entities such as, for example, an Uninterruptible Power Supply (UPS) and/or a UPS component and a host computer system. However, it should be appreciated that such a protocol may be implemented in other types of systems, including, but not limited to, air conditioning systems, home automation systems, field monitoring systems, or other system applications having monitoring and control functions.

In one embodiment, the protocol allows access to a device (e.g., a UPS) by a communicating system (e.g., a computer). Such access may be required, for example, to ensure there is no unauthorized access or control of the device. For instance, an unauthorized personal computer may access a UPS device to shut down or reconfigure the UPS system. In one example, access is performed by way of a bidirectional locking feature. In one embodiment, such a feature allows, for example, a device (e.g., a UPS) to communicate only with authorized software (e.g., an application executing on a host computer), and the software to communicate with an authorized device (e.g., an authorized UPS). In another embodiment, a proxy system may be used to access a device (e.g., a UPS or UPS component). In one example, a management system associated with the UPS is used to communicate information from other systems to the device. The management system may act as a proxy for the purpose of performing management functions or obtaining information from one or more managed devices (e.g., a UPS or UPS component).

Such access may be permitted based upon a bidirectional locking key stored at both the device and the communicating system. In the UPS example above, when the UPS is in a locked mode (e.g., a communicating system that accesses the UPS does not have the proper key), the UPS only allows data to be written to a publicly accessible section of the memory. For instance, the UPS may only allow a communicating system to access public areas of a memory device of the UPS (e.g., an EEPROM, RAM, etc.). Other data write operations to non-public areas of the memory are not permitted. In this manner, operations using configuration and operating parameters may not be performed without a correct key. In one example, the key may be determined using publicly-accessible information stored in one or more public areas of a master device.

In another embodiment of the invention, a method is provided for relaying the access information by an intermediate entity without the need to understand or unlock the transmitted information. That is, an entity, referred to herein as a proxy, is permitted to relay the transmitted information without necessarily understanding the protocol. According to one embodiment, information describing the format of data in the transmitted information is contained within the transmitted information itself.

According to another embodiment of the invention, a method for invoking an alternate communication protocol is provided. For example, a method for booting and loading ("bootloading") new firmware to a master is included in the protocol. According to one embodiment, a slave is adapted to send a signal to the master that causes the master to enter into a boot load mode. In one specific example, the slave writes a value to a register of the master that causes the master to enter into a boot load mode. In one embodiment, the boot load protocol is an ASCII protocol that is used to send one or more files to the master for self-reprogramming. In one example, the master, upon having a particular register value set, will request one or more files from the slave. In another example, the one or more boot files include checksum information, and the master is adapted to check the one or more files before loading the files into memory.

Example System

FIG. 1 is a block diagram of an example network system in which various aspects of the present invention may be practiced. In particular, system 100 includes one or more systems connected by one or more networks. In the example shown, system 102 is coupled to a proxy system 101 over network 103. According to one aspect of the present invention, proxy system 101 has a capability for communicating to system 102 using a communication protocol. Communication with system 102 may be useful, for example, for monitoring or managing system 102 by system 104. In an alternative configuration (not shown), system 102 may be coupled directly to another system (e.g., system 104), and various aspects of the communication protocol described herein may be used to communicate between them.

Further, according to another aspect of the present invention, a proxy system 101 is provided that translates requests from one or more systems (e.g., system 104) to requests that may be recognized by system 102. These requests may be, for example, messages generated by an application program executing on system 104. One example application program that may generate such requests is a management program that is provided for managing one or more systems (e.g., system 102). These requests may include control data used to control and configure system 102, requests for performance and/or status information from system 102, among others. To this end, proxy 101 may be capable of translating received management requests to messages that are capable of being processed by system 102. Although proxy 101 may be capable of communicating management data, it should be appreciated that proxy 101 may be capable of translating any type of request having any type of data.

It should be appreciated that proxy system 101 is capable of being coupled to more than one system. In one example, proxy system 101 is coupled to two or more networks (e.g., network 103 and network 105). To this end, proxy 101 may have more than one network interface. Proxy 101 may also be capable of communicating using one or more communication protocols. According to one aspect of the present invention, a proxy may be capable of learning new protocols from a system to which the proxy system is coupled. A specific example of a proxy and its capabilities are discussed below with reference to FIG. 18.

System 100 is merely an illustrative embodiment of a communication system that may implement one or more aspects of a communication protocol according to various embodiments of the invention. Such an illustrative embodiment is not intended to limit the scope of the invention, as any of numerous other implementations of the system (e.g., variations of 100 having more or less systems) are possible and are intended to fall within the scope of the invention.

Various embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, or any other type of processor. In one specific embodiment, various aspects of a communication protocol are provided that may be used by computer systems such as controllers. Such controllers may be embedded in one or more systems, such as, for example, an Uninterruptible Power Supply (UPS) or one of its components. However, it should be appreciated that one or more of any type computer system may be used to communicate according to various embodiments of the invention. It should also be appreciated that different types of systems (e.g., a PC, a controller, etc.) may communicate with each other using various aspects of the present invention.

A general-purpose computer system according to one embodiment of the invention is configured to perform any of the described communication functions including but not limited to communicating between computer systems and/or relaying data to other systems (e.g., to system 206). It should be appreciated that the system may perform other functions, and the invention is not limited to having any particular function or set of functions. Various entities such as, for example, systems 102, 104 and proxy 101 may be general-purpose computer systems that implement various communication functions according to various embodiments of the present invention.

Figure 2:
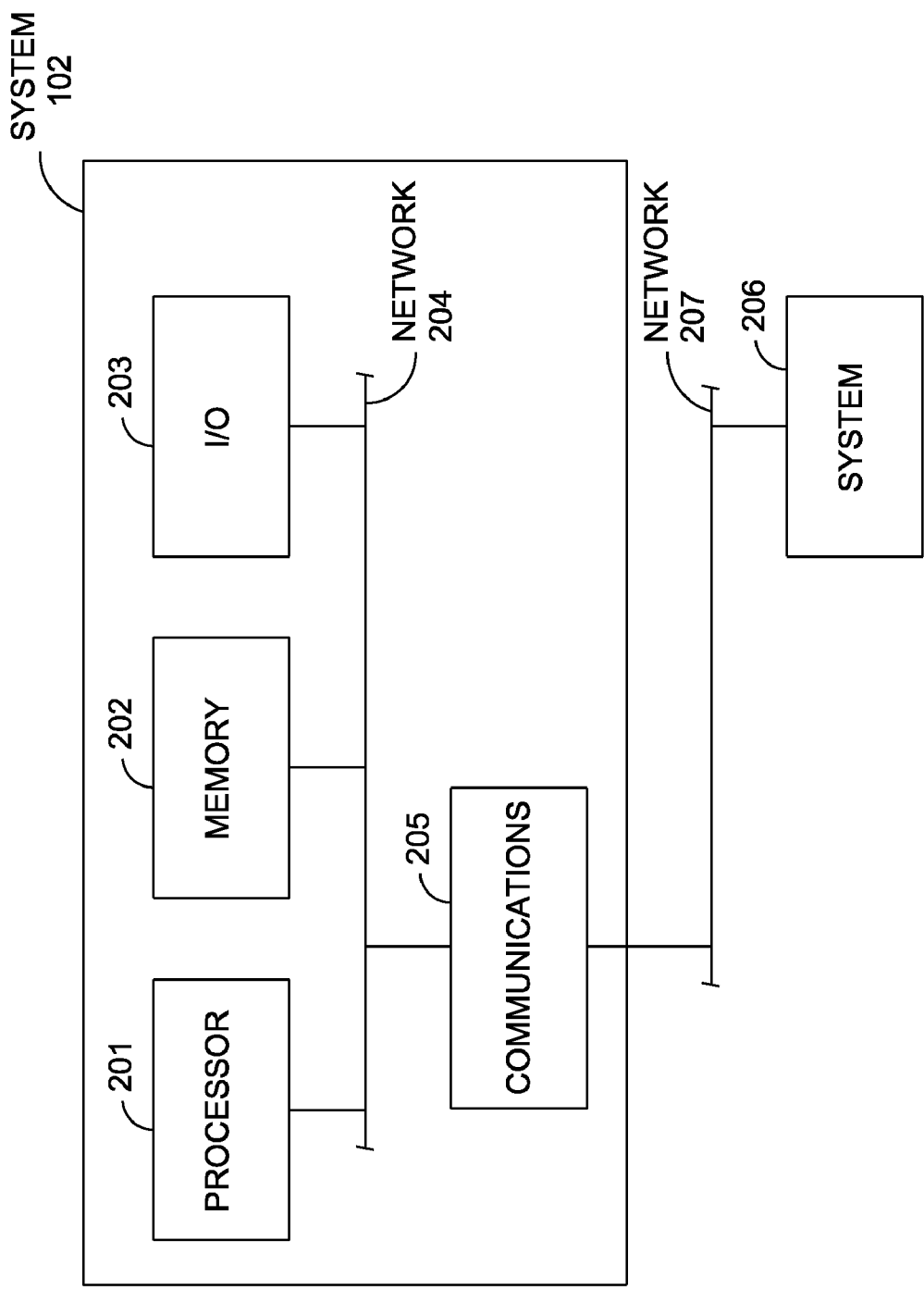
FIG. 2 is a block diagram of a communication system according to one embodiment of the present invention.

For example, various aspects of the invention may be implemented as specialized software executing in a general-purpose computer system such as that shown in FIG. 2. The computer system 102 may include a processor 201 connected to one or more memory devices 202, such as a disk drive, memory, or other device for storing data. Memory 202 is typically used for storing programs and data during operation of the computer system 102. Components of computer system 102 may be coupled by an interconnection mechanism (e.g., network 204), which may include one or more busses (e.g., between components that are integrated within a same machine) and/or a network (e.g., between components that reside on separate discrete machines).

The interconnection mechanism 204 enables communications (e.g., data, instructions) to be exchanged between system components of system 102. System 102 also includes one or more I/O devices 203 (e.g., ports, devices, systems, etc.) for inputting and outputting data. In addition, system 102 may contain one or more interfaces 205 that connect computer system 102 to a communication network 207. System 102 may be capable of learning one or more protocols used to communicate by one or more systems (e.g., system 206).

According to one embodiment of the invention, interface 205 may be a serial-type interface that is used to communicate to an attached device. The interface may be capable of communicating using various aspects of the present invention. Such an interface 205 may use one or more serial-type transport layer protocols including, but not limited to, TTL serial, RS-232, RS-422, RS-485, I2C, CAN, or any other transport layer capable of moving packets between systems.

System 102 typically includes a storage mechanism as a part of memory 202 or other storage that includes computer readable and writeable nonvolatile recording medium in which signals are stored that define a program to be executed by the processor or information stored on or in the medium to be processed by the program. The medium may, for example, be a disk, flash memory, EEPROM, RAM, or the like. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). This memory may be located in a storage system, or in memory system 202.

The processor 201 generally manipulates the data within the memory and then copies the data to the medium after processing is completed. A variety of mechanisms are known for managing data movement between the medium and the memory elements, and the invention is not limited thereto. It should be appreciated that the invention is not limited to a particular memory system or storage system.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 102 is shown by way of example as one type of computer system upon which various aspects of the invention may be practiced, it should be appreciated that aspects of the invention are not limited to being implemented on the computer system as shown in FIG. 2. Various aspects of the invention may be practiced on one or more computers having a different architecture or components that that shown in FIG. 2.

System 102 may be a general-purpose computer system that is programmable using a high-level computer programming language. System 102 may be also implemented using specially programmed, special purpose hardware. In computer system 102, processor 201 is typically a commercially available processor such as the well-known Pentium class processor available from the Intel Corporation. Many other processors are available. Such a processor usually executes an operating system which may be, for example, the Windows NT, Windows 2000 (Windows ME) or Windows XP operating systems available from the Microsoft Corporation, MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, Con, Ada, or C# (C-Sharp). Other object-oriented programming languages may also be used. Alternatively, functional, scripting, and/or logical programming languages may be used. Various aspects of the invention may be implemented as programmed or non-programmed elements, or any combination thereof.

Figure 3:
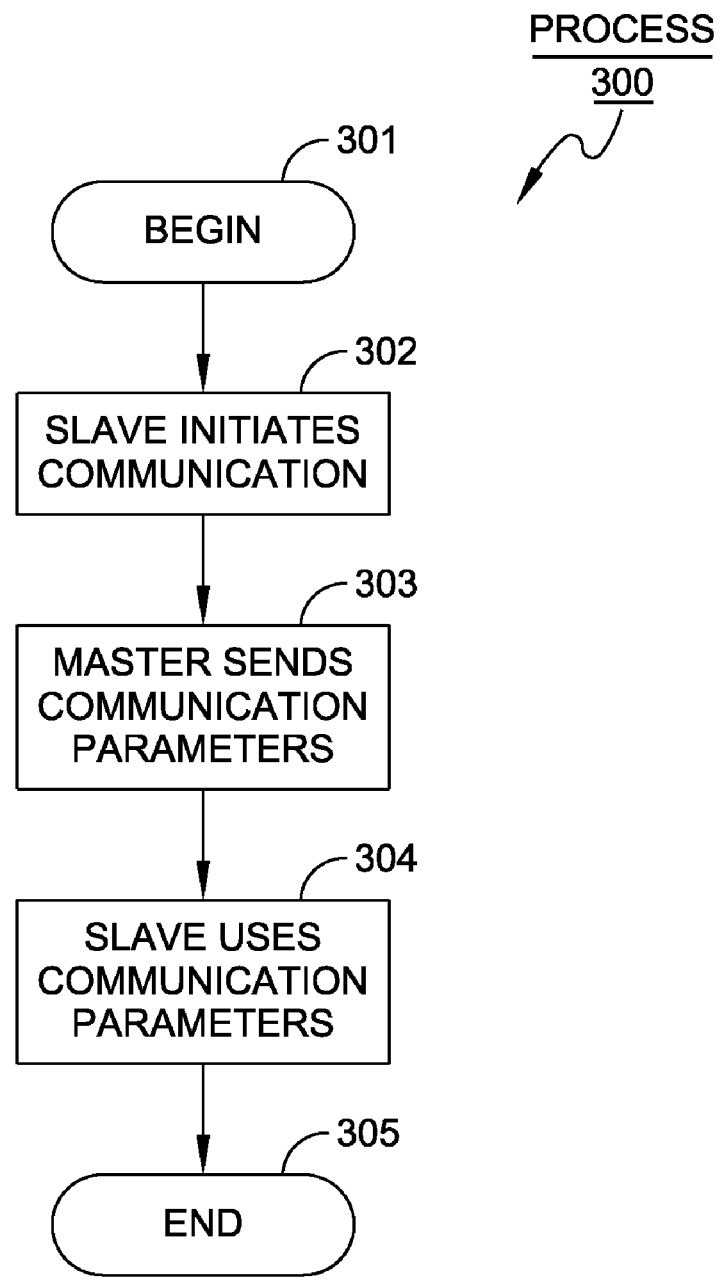
FIG. 3 shows a process for establishing communication between two entities according to one embodiment of the present invention.

FIG. 3 shows a process for establishing a communication according to one embodiment of the present invention. At block 301, process 300 begins. At block 302, a slave system initiates communication with a master system. In one embodiment, the slave system is a management system that is adapted to manage one or more master systems. In one aspect of the present invention, the slave system determines the protocol by which the slave, and optionally, other entities through the slave system, communicate with the master system.

The slave system may initiate communication between the master and slave systems, for instance, by sending a sequence of messages that, when received by the master system, cause the master system to send communication parameters to the slave (e.g., at block 303). At block 304, the slave uses the communication parameters to communicate with the master system. Such communication parameters may, for instance, indicate the version of the protocol used, the length of messages used to communicate, a memory and/or data structure layout, or other communication information.

Figure 4:
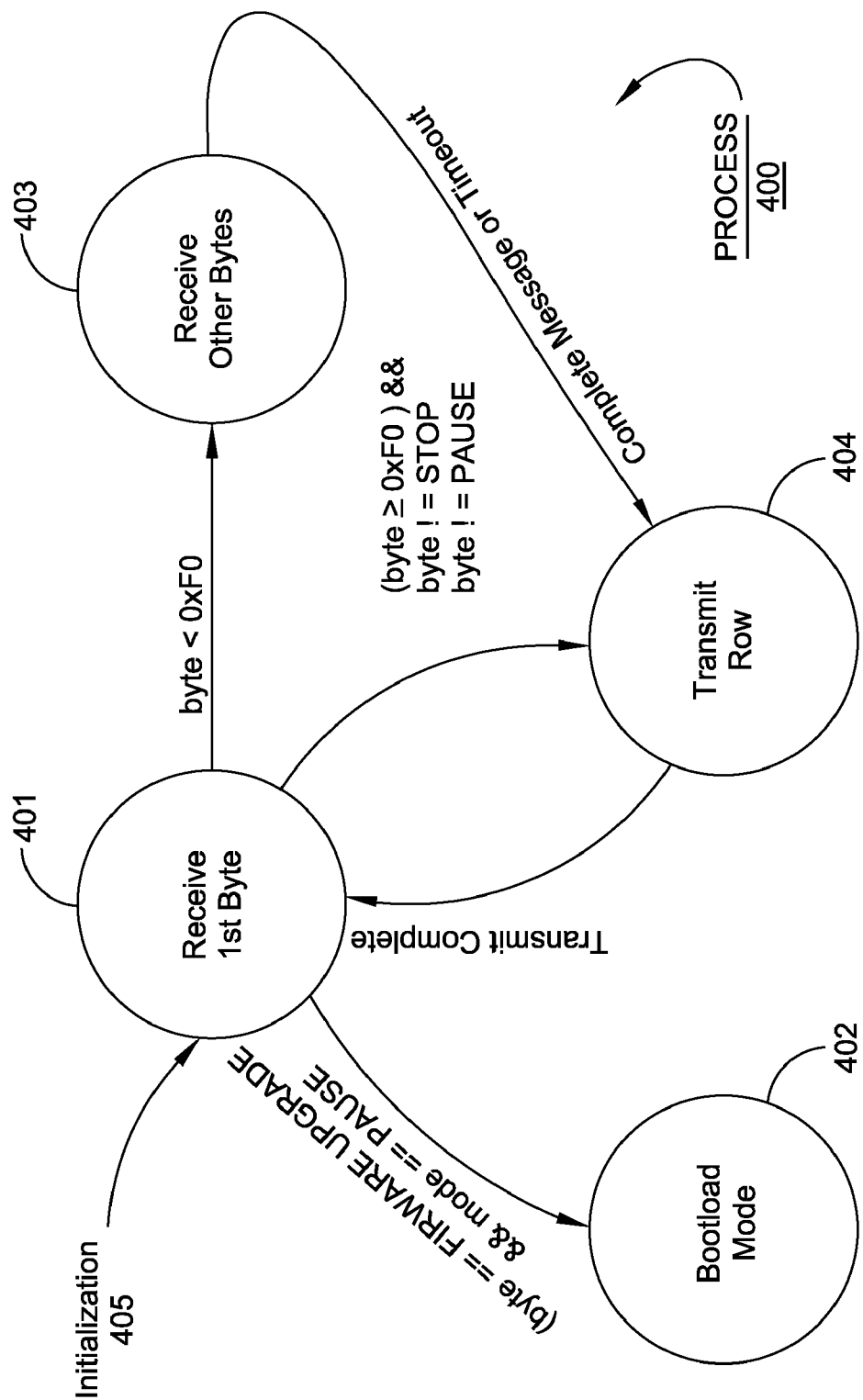
FIG. 4 is a state diagram of a master communication according to one embodiment of the present invention.

FIG. 4 shows a process 400 performed by a master system according to one embodiment of the present invention. Specifically, FIG. 4 shows a state diagram of a communication process performed by a master system. In one example, the master includes an engine that runs a communication protocol having four states. This state diagram may be, for example, performed by a processor of a UPS or a UPS component as discussed above. In a specific example, the state diagram shown in FIG. 4 is implemented in a UPS device, and is programmed in a programming language in firmware to execute a communication protocol according to one embodiment of the invention.

The communication protocol includes four basic states (states 401-404) and one flag that indicates that communications are active (e.g., a COM_VALID flag). Upon initialization 405 of the master, the master initializes the communications active flag. The four basic states include a first state 401 which includes waiting to receive a first character (e.g., a first byte) of a message from the slave. If the first character is a single-byte message, then the master processes the single byte message by transmitting the appropriate row to the salve. In a second state 403, the master receives the remainder of a message from the slave (e.g., receives other bytes associated with the message). At state 404, the master transmits any row information to the slave in response to the information received from the slave.

According to one example implementation, the protocol may include additional protocol features, such as, for example, a boot loading feature. In particular, the boot loading feature may provide the master one or more files to reprogram itself. While the master is in a paused or idle state, the master waits for a NAK character to resume. Alternate protocols such as, for example, a boot loader, XMODEM file transfer, terminal mode, or other protocol feature may be invoked while in the idle state by sending a predetermined character to start a specified protocol. If, while in the pause state, the master receives a start character for an alternate protocol, the master system transitions to running the alternate protocol (e.g., a boot load protocol) at state 402. For instance, if the first character received by the master is a PAUSE character, then the master enters a pause state. If, while in the pause state, the master receives a signal from the slave to enter into a boot load mode, the master system transitions to a boot load mode state 402. At this point, the master may request one or more files from the slave to complete the booting operation.

If, while in the pause state, the master receives any other character, the master begins an alternate protocol. If the slave signals exit from the PAUSE mode with a negative acknowledgement (NAK), the master proceeds to transmit the appropriate row with the appropriate data. When in pause mode, the master remains in this state until a signal is received from the slave (e.g., a negative acknowledgement (NAK), or the master is reset). According to one embodiment, the master will remain in the pause mode until reset or receiving a further signal from the slave. That is, the master does not timeout within the pause mode.

As discussed, according to one embodiment, a communication protocol may be implemented that includes one or more timeout mechanisms. According to one embodiment, a dual timeout may be used between a master and a slave. In one embodiment, the timeout mechanism provides a method for detecting communication problems on a communicating network (e.g., a data bus) and defines a standard recovery process. In one example, a maximum time is set between bytes (e.g., a byte timeout) in a message. For example, this timeout may be approximately 25 milliseconds, but this timeout period may be adjusted to other values. In one example, once a message packet has started sending subsequent bytes in a message, the message must be transmitted at a rate greater than this timeout to ensure that the data is received. If bytes are not received in a message at this rate, the packet is discarded and a negative acknowledgement (NAK) is sent to the slave. Further, a recipient of a packet may have another timeout that measures the time by which a message response may be received. If a response to a message does not occur within a defined timeout period (e.g., 250 milliseconds) the device considers the transmission a failure and acts accordingly.

Figure 5:
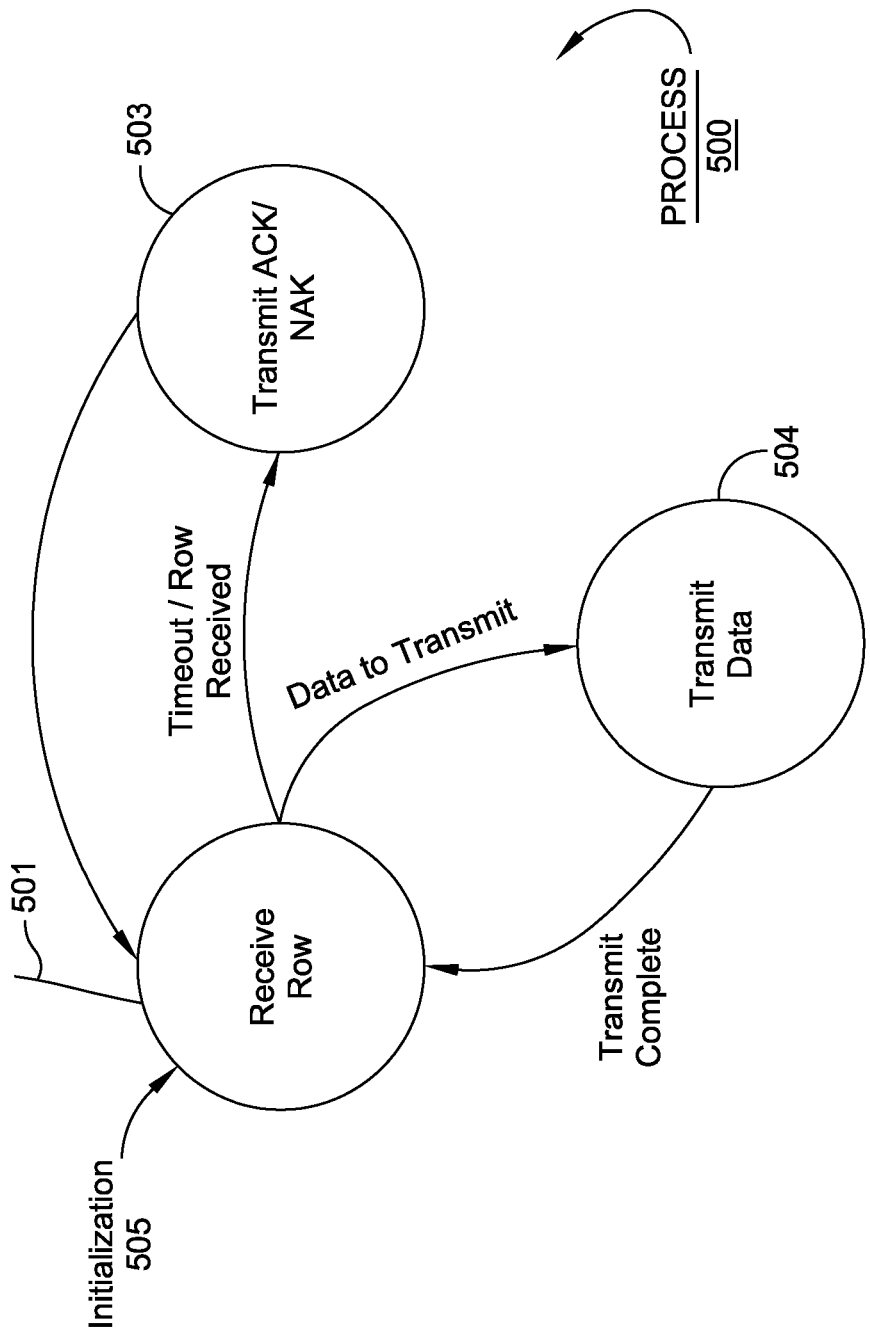
FIG. 5 is a state diagram of a slave communication according to one embodiment of the present invention.

FIG. 5 shows an example process 500 for performing communication by a slave system according to one embodiment of the present invention. In particular, FIG. 5 shows a state diagram that may be executed by a slave system in association with communicating with a master as discussed above with reference to FIG. 4. In particular, the state diagram may include four states (states 501-504) at which the slave system may be during any point in communication with the master. Such a state diagram may be performed, for example, in software, hardware, or both within a slave system.

Upon initialization 505, a slave enters a receive state where the slave is capable of receiving a row of data from a master device. The slave system may also be in an acknowledgment mode 503 wherein the slave system transmits acknowledgement (ACK) messages or negative acknowledgement (NAK)

messages as appropriate depending on whether information was properly received from the master system. As discussed in the example above, if a particular message is not received within a predetermined timeout period, the slave may send a negative acknowledgement to the master system, prompting the master system to resend the message.

At state 504, the slave system may transmit any data as necessary to the master system. Such transmitted data may include, for example, write commands that perform the writing of information to memory locations of the master system, read requests for reading information from appropriate memory locations, or any other reading or writing operations.

Figure 6:
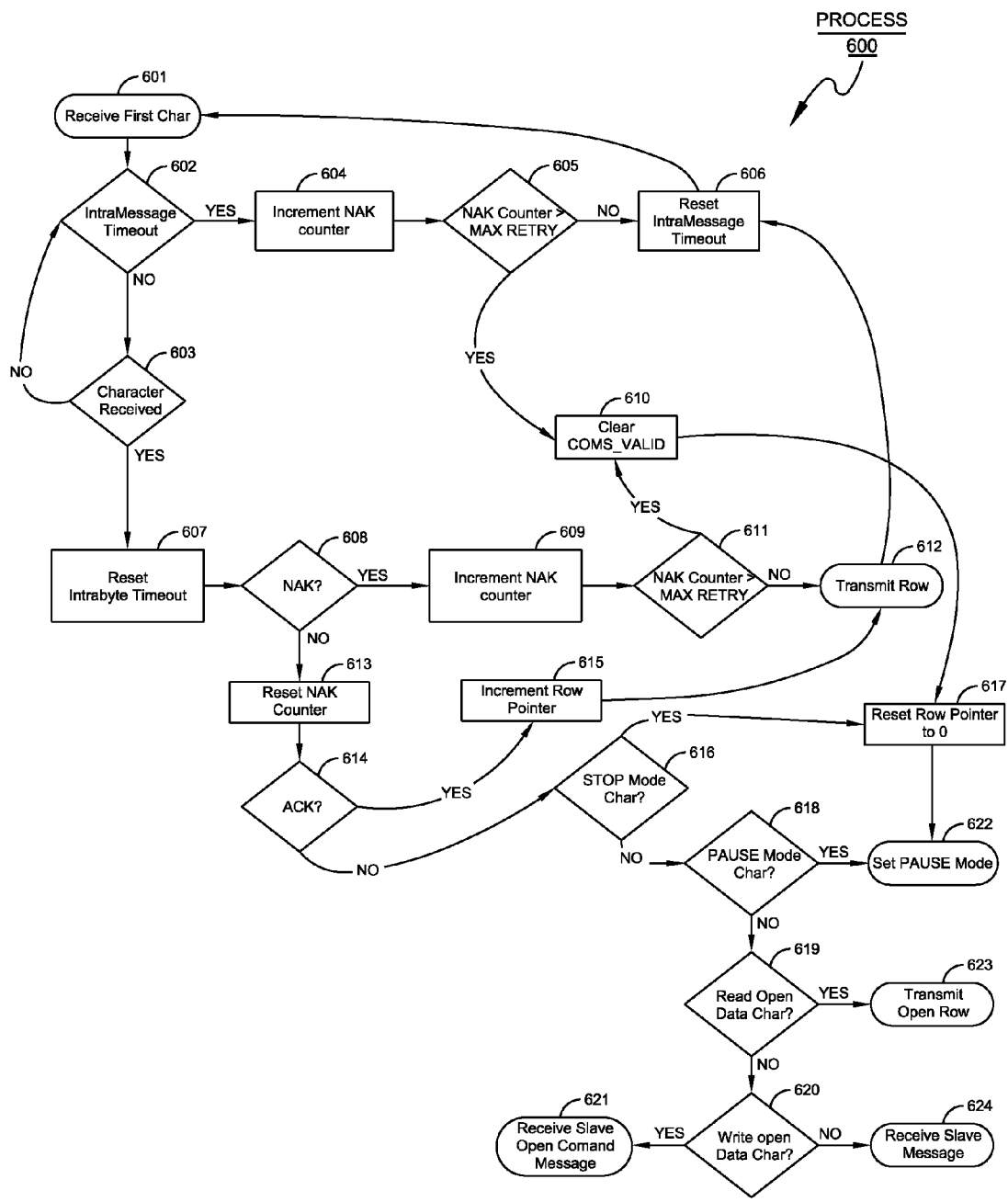
FIG. 6 is a flow chart of a communication process according to one embodiment of the present invention.

FIG. 6 shows an example flow chart of a process 600 that occurs during the received first character state 401 as described above with reference to FIG. 4. At block 601, the master receives a first character from a slave system. At block 602, an intramessage timeout timer is started to track the time over which the message may be sent. If the message is not sent within an intramessage timeout value, a negative acknowledgement is sent at block 604, and a NAK counter is incremented. If, at block 605 it is determined that the value of the NAK counter exceeds the maximum number of retries permitted to send a message, a communication valid (communication active) flag is cleared at block 610. If the NAK counter is not exceeded, the message was received and the intramessage timeout is reset at block 606, and the master is ready to receive the first character of another message.

As discussed, there may be two levels of timeouts that may be used, one for messages and one for receiving consecutive bytes within a message. At block 603, if a character is received, an intrabyte timeout is reset at block 607. If, at block 608, a negative acknowledgement (NAK) is received, a negative acknowledgement counter is incremented at block 609. If, at block 611, the NAK counter exceeds a maximum number of retries for sending a consecutive byte, then an active communication flag is reset at block 610. If not, the byte has been successfully transmitted and the timers are reset for receipt of another byte and/or message.

If, at block 608, a NAK is not received, the NAK counter is reset at block 610. At block 610, it is determined whether an acknowledgement is received from the slave system. If yes, the master prepares to send an additional row, and a row pointer is incremented at block 615. At block 612, the master transmits a row to the slave. If an acknowledgement is not received at block 614, it is determined whether the master has received a stop character at block 616. If so, the master resets the row pointer to zero at block 617 and enters the pause mode at block 622.

If a stop mode character is not received at block 616, it is determined whether a pause mode character has been received by the master at block 618. If so, the master enters the pause mode at block 622. If not, the master determines whether a read open data character has been received at block 619. If so, the master transmits an open row to the slave at block 623. If not, the master determines whether a write open data character has been received from the slave at block 610. Is so, the master receives a slave open command message at block 621. If not, the master receives a slave message at block 624.

Figure 7:
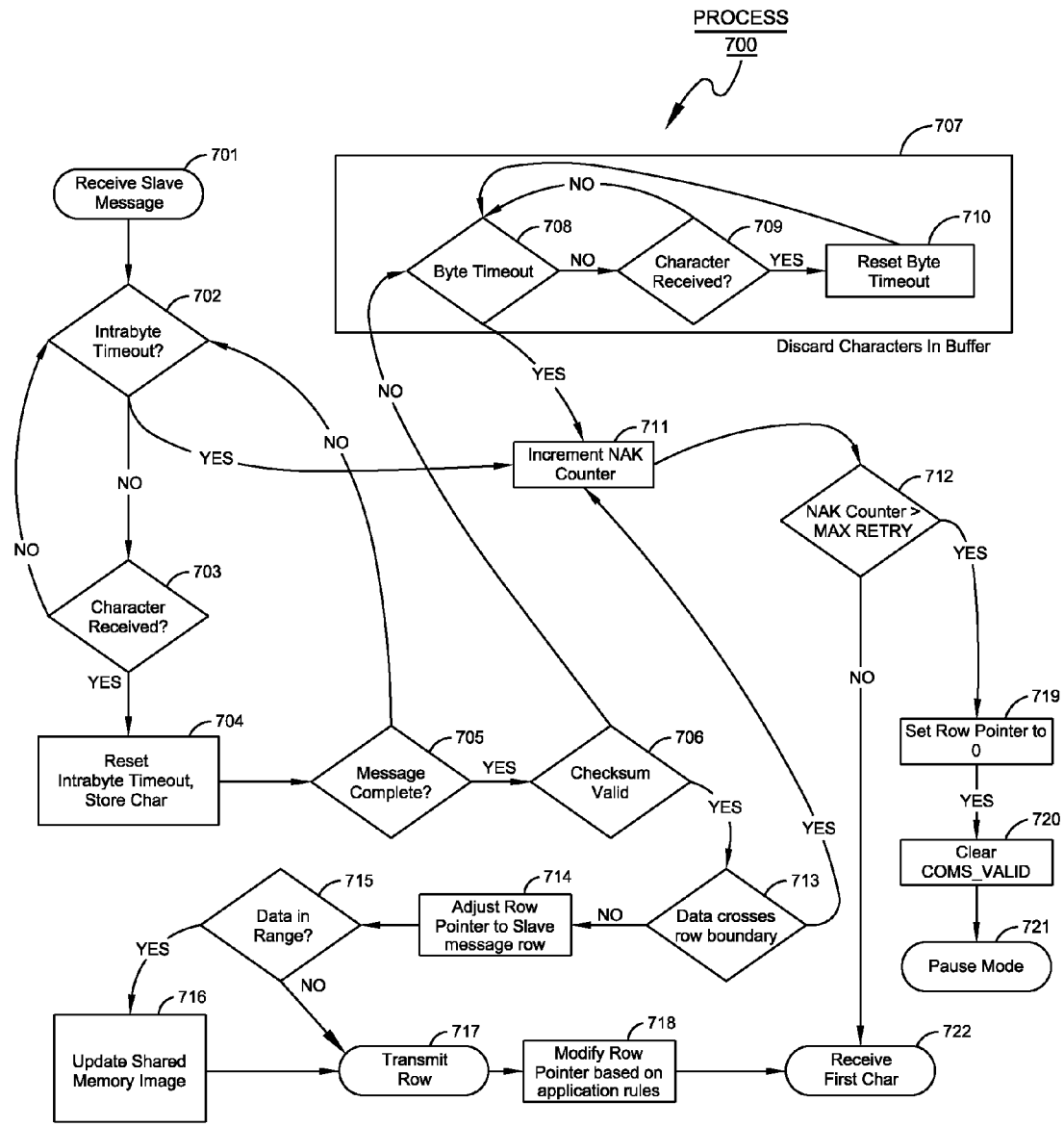
FIG. 7 is a flow chart of a communication process according to one embodiment of the present invention.

FIG. 7 shows a process 700 that may be performed by a master while in the received message state 403. At block 701, a master system receives a slave message. At block 702, it is determined whether an interbyte timeout has been exceeded. If so, a NAK counter is incremented at block 711. If, at block 712, it is determined that the NAK counter exceeds a maximum number of retries for sending the message, then the row pointer is set to zero at block 719. Further, an active communication flag is cleared at block 720, and the master enters the pause mode at block 721. If, at block 712 it is determined that the number of NAKs does not exceed the maximum number of retires, the message has been received correctly and the master transitions to a received first character state at block 722.

If a character is received at block 703, then the intrabyte timeout is reset at block 704 and the character is stored in a memory of the master. At block 705, it is determined whether the message is complete. If so, it is determined whether the message received is valid based on a checksum received in the transmitted message at block 706. If not, it is determined whether to discard characters in the receive buffer. More particularly, at block 708, it is determined whether a byte timeout has been exceeded. If not, it is determined whether a character is received at block 709. If so, the byte timeout is reset at block 710. If a character has not been received, it is determined whether the byte timeout has been exceeded. If so, the NAK counter is incremented at block 711 as discussed above.

If the checksum is determined valid at block 706, it is determined whether data crosses a row boundary at block 713. If so, the received message is invalid and the NAK counter is incremented at block 711 as discussed above. If data does not cross a row boundary, a row pointer is adjusted to the slave message row at block 714. At block 715 it is determined whether the data message received is within the range of memory of the master at block 715. If so, shared memory image of the master is updated with the appropriate data at block 716. If not, the master transmits row information 717 to the slave. Further, the row pointer is modified based on an application rule for sending information to the slave at block 718. The master then transitions to the receive first character state at block 722.

It is noted that the transmit row flow operates to output the characters of a row guaranteeing that characters are transmitted faster than the interbyte timeout between successive characters.

Figure 8:
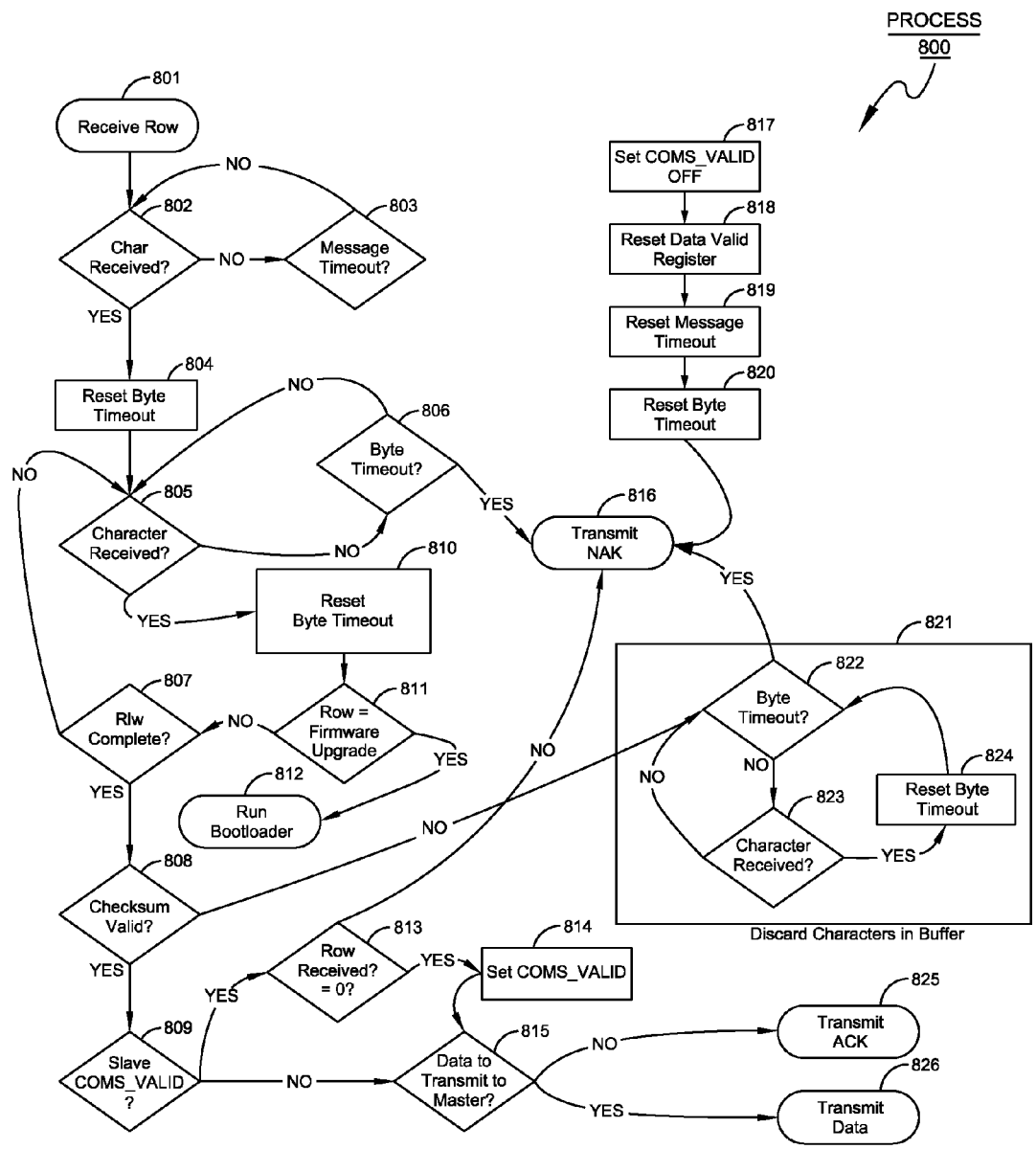
FIG. 8 is a flow chart of a communication process according to one embodiment of the present invention.

FIG. 8 shows an example process 800 that may be implemented in a slave system during the receive row state 501 as discussed above with reference to FIG. 5. At block 801, the slave system enters the receive row state. At block 802 it is determined whether a character is received at the slave. If not, it is determined at block 803 whether a message timeout has been exceeded. If not, the slave monitors for characters received from the master. If the character is received, a byte timeout is reset at block 804. At block 805 it is determined whether a character has been received. If not, it is determined whether the byte timeout has been exceeded at block 806. If not, the slave continues to monitor for additional characters received from the master.

If the byte timeout has been exceeded at block 806, the slave transmits a NAK to the master at block 816. If a character is received at block 805, the byte timeout is reset at block 810, and it is determined at block 811 whether the row information indicates that the firmware or other software of the master should be upgraded. If so, the slave enters a run boot loader state at block 812. During this state, the slave may provide one or more files to the master to reprogram itself. If, at block 811, it is determined that the master does not request to enter the boot load state, it is determined at block 807 whether the transmitted row is complete. If not, additional characters may be received at block 805. If the row is complete, it is determined whether the transmitted row is valid given a checksum included in the received message at block 808. If so, it is determined whether a slave communication flag is set at block 809. If so, it is determined whether the received row is row zero at block 813. If so, a communication active flag is set at the slave of block 814. If, for example, the row received is not row zero, the slave may transmit a negative acknowledgment (NAK) to the master at block 816.

When the communication active flag is set at block 814, it is determined whether there is data to transmit to the master at block 815. If not, the slave merely transmits an acknowledgement to the master that row zero was received successfully at block 825. If the slave does have data to transmit to the master, the slave does so at block 826.

If, at block 808, it is determined that the checksum is not valid, the slave enters a discard mode where characters are discarded in the buffer at block 821. More specifically, it is determined at block 822 whether a byte timeout has been exceeded. If not, it is determined whether a successive character has been received at block 823. If so, a byte timeout is reset at block 824. If not, the slave continues to wait for characters until the byte timeout is exceeded at block 822.

If a message timeout is exceeded at block 803, an active communication flag at the slave is set to off at block 817. Further, a data valid register is reset at block 818, and a message timeout and byte timeout are reset at blocks 819 and 820, respectively. Also, a negative acknowledgement is transmitted to the master at block 816.

Figure 9:
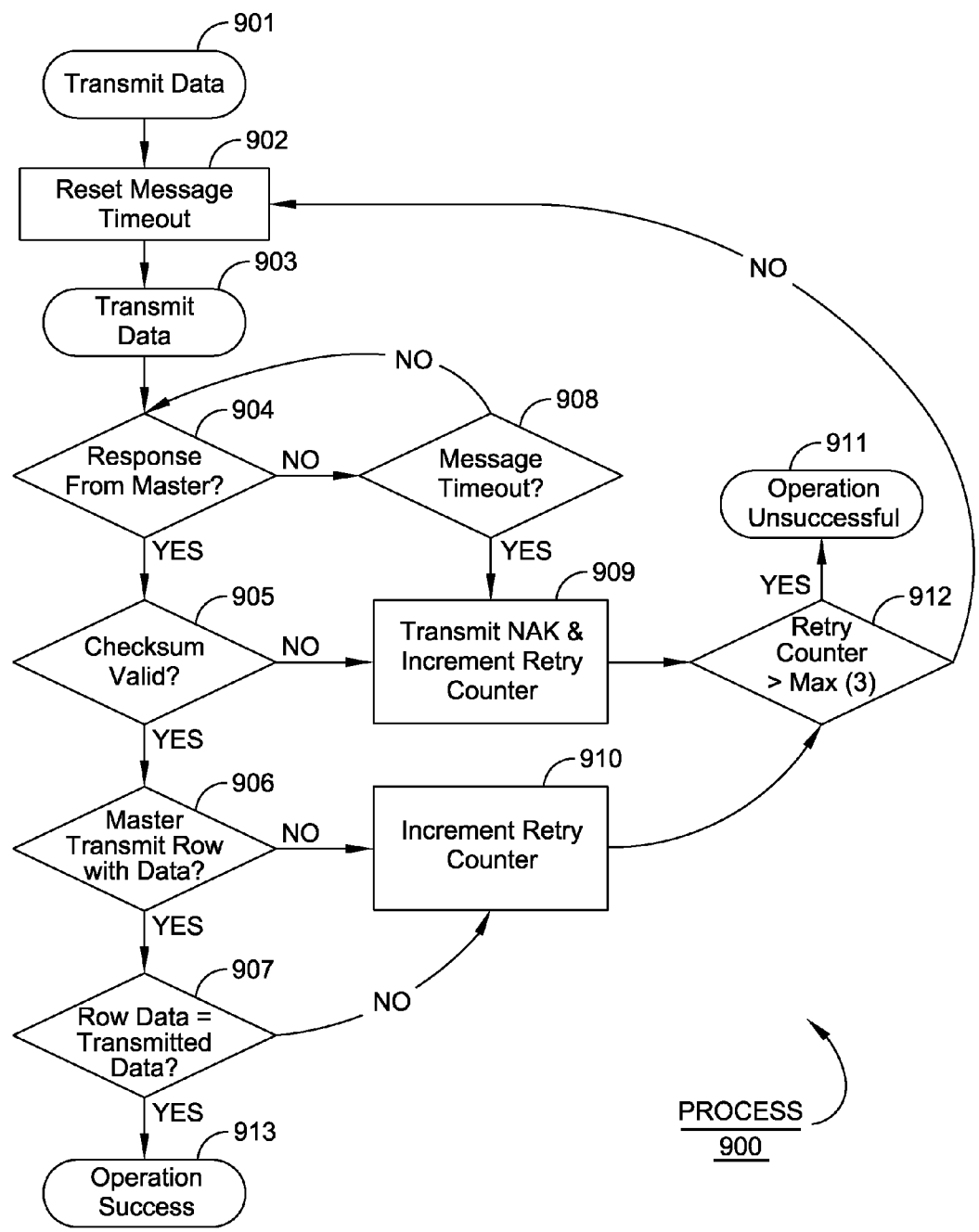
FIG. 9 is a flow chart of a communication process according to one embodiment of the present invention.

FIG. 9 shows a process 900 followed by the slave while in a transmit data state 503. At block 901, the slave enters the transmit data state. At block 902, a message timeout is reset at the slave. At block 903, the slave enters the transmit data state and begins to transmit information to the master. At block 904, it is determined whether a response is received from the master. If not, it is determined whether a message timeout is exceeded at block 908. If the message timeout has not been exceeded, the slave waits for a response from the master.

If the slave receives a response from the master, it is determined whether the received information is valid. For example, a checksum may be included in the transmitted information and the slave may determine whether the information is valid based on the checksum.

If the checksum is valid, it is determined whether the master transmitted a row having data at block 906. If so, it is determined at block 907 whether the row data is the same as the transmitted data. If so, the operation is indicated as a success at block 913.

If the row data does not equal the transmitted data, a retry counter is incremented at block 910. If, at block 912, it is determined that the retry counter exceeds a maximum value (e.g., 3) the operation is indicated as being unsuccessful at block 911. If not, the slave waits for the receipt of another message from the master at block 902. If, there is a message timeout at block 908 or the checksum is not valid at block 905, the slave transmits a NAK to the master and increments its retry counter at block 909. Again, if the retry counter exceeds a maximum value at 912 at block 912, the operation is indicated as being unsuccessful at block 911.

Messaging

According to one aspect of the present invention, there are three possible messages that may be used to communicate between a slave and a master system. More particularly, there may be a master transmission which is a transmission from a master to a slave, a slave transmission which is a transmission from a slave to a master, and a slave single byte command that is executed at the master.

Figure 10:
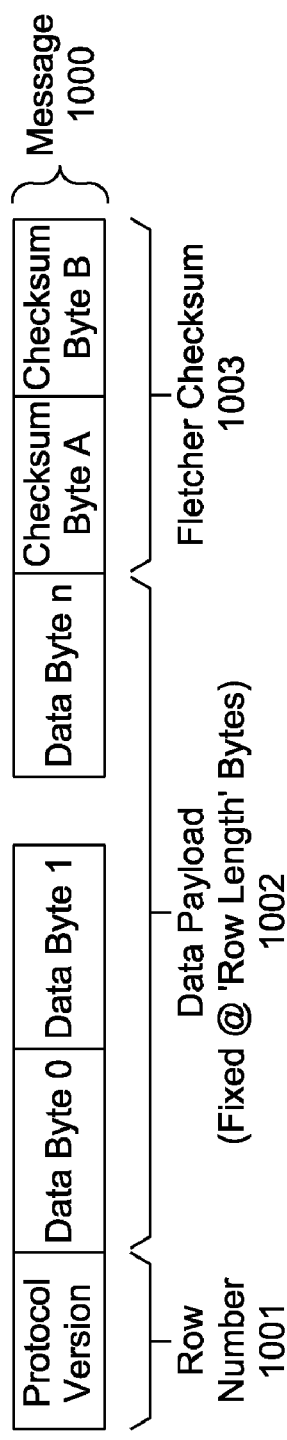
FIG. 10 is a block diagram of a master message format according to one embodiment of the present invention.

FIG. 10 shows one example master format according to one embodiment of the invention. In one example, a master system transmits messages having the same length and format. Message 1000 may include, for example, a row number 1001 that indicates the position of the data being transmitted by the master system. In row 0, the row 1001 may indicate the version of the communication protocol. Message 1000 may also include a data payload which includes one or more data bytes 0 through n. In one embodiment, the length of each message 1000 sent by the master may be a fixed length. In one example, this fixed length may vary between master implementations. This fixed length may be determined, for example, based on the protocol version 1001 which may be located, for example, in a row 0 data element or by a row length byte located in row 0.

Message 1000 may also include checksum information used to verify the contents of a particular message. In one embodiment, message 1000 includes a Fletcher checksum 1003. A Fletcher checksum is a well-known checksum used for detecting errors as more fully described below. However, it should be appreciated that any other type of checksum may be used to verify the transmitted information.

Figure 11:
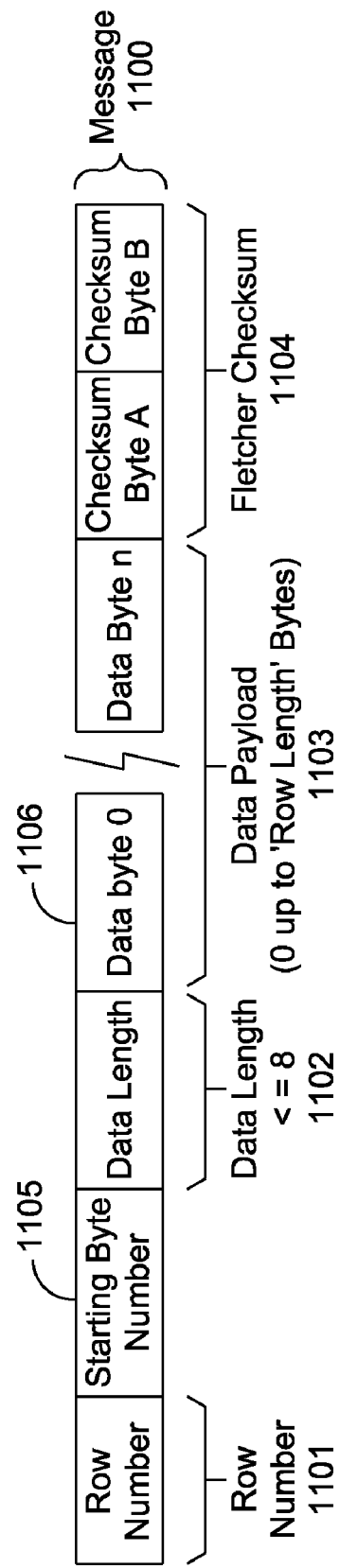
FIG. 11 is a block diagram of a slave message format according to one embodiment of the present invention.

A slave system may transmit in one of two different formats according to one embodiment of the invention. The first data format is a single byte message and the second is a multi byte communication message. FIG. 11 shows an example message format 1100 according to one embodiment of the invention. Message 1100 includes a row number 1101 that specifies the type of message being transmitted. According to one embodiment, there are three possible values of row number 1101. For example, a value of 0xFD indicates a negative acknowledgement (NAK) message.

According to one embodiment, NAK messages are used to initiate communications between a master and a slave. Other single byte commands that may be invoked by the slave include, but are not limited to, commands to stop communication, pause communication, acknowledge (e.g., ACK) a transmission or not acknowledge (e.g., NAK) a transmission. In one specific example, a message having a row number 1101 value greater than 0xF0 is a single byte command or a special command. According to one embodiment, special commands may be used to expand the functionality of the protocol. According to one embodiment, such a message may include the first byte of a multi-byte message.

As discussed, the last type of message that a slave may transmit to a master is a multi-byte message used to request to change data stored at the master. Such a message may take the same form as message 1100 shown in FIG. 11. Message 1100 includes starting byte number 1105 which indicates a row offset where data byte zero (item 1106) is to be written. Data length 1102 indicates the number of data bytes in data payload 1103. According to one embodiment, the data payload must be less than or equal to the length of the row transmitted by the master (e.g., 8 bytes). For example, to write through a third element of a memory location that is 2 bytes long, the starting position is indicated in message 1100 as 3, and the length is indicated as 2. Similar to message 1000, message 1100 may include checksum information. In one specific example, a Fletcher checksum 1104 may be used as discussed further below.

A message 1100 having a data length value of zero (0) in field 1102 may be interpreted by a particular master implementation as a request for the master to send a specified row.

Example Transactions

Figure 12:
FIG. 12 is a block diagram of a master message format according to another embodiment of the present invention.

FIG. 12 shows one embodiment of a message transaction according to one embodiment of the present invention. In particular, a master system transmits a message 1201 to a slave, and after some response time 1202, a slave responds with an appropriate message 1203. In one embodiment, the response is an acknowledgement message 1207 indicated by a 0xFE value for the row value (first byte). Master message 1201 includes a row 1 byte 1204 and a data payload 1205. In one embodiment, the data payload ranges from 0 bytes to 239 bytes. Optionally, master message 1201 includes a Fletcher checksum 1206 as described above.

Figure 13:
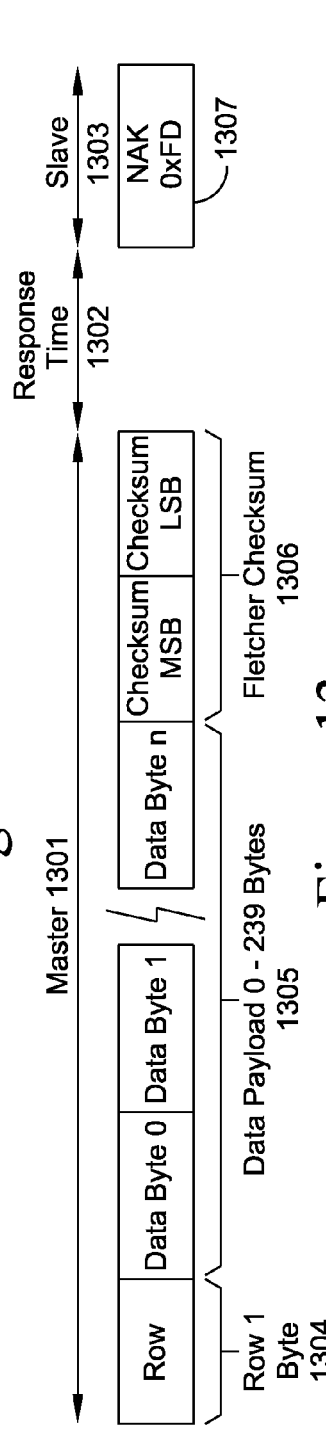
FIG. 13 is a block diagram of a master message format according to another embodiment of the present invention.

FIG. 13 shows another embodiment wherein a master sends a message 1301 similar to 1201 (e.g., one having a first byte 1304 followed by a data payload 1305, and optionally, a Fletcher checksum 1306). However, the slave, after some response time, does not receive message 1301. This may occur, for example, if the master does not transmit the information quickly enough (e.g., there are more than the predetermined number of byte timeouts), there are transmission errors (e.g., a corrupted byte, dropped byte or other change in transmitted data), or other transmission or reception problems that cause the data not to be transferred properly. In such a case, the slave system issues a message 1303 indicating that message 1301 was not received. After which indication, the master may resend message 1301. Message 1303 may be, for example, a NAK message 1307 as described above, which may be indicated by a row value (first byte) of 0xFD.

In general, a master may receive one of four basic responses from a slave system. A slave may respond with a single-byte NAK, and in response, the master will retransmit the same data packet. A slave may send a single-byte ACK, and in response, the master will proceed to transmit the next block of data in the message. A slave may also send a multi-byte message with the first byte not indicated as an ACK or a NAK. In the absence of a checksum error, the master may be configured to update its local memory with data received from the slave. According to one embodiment, the master updates its memory only after validating that the received data is in the appropriate range. If validated, the master may respond with a message including the row containing the address in a response packet. If a checksum error occurs, the master system may respond with NAK message (i.e., requesting a retransmission of the last row), after which, the slave may resend the message.

Figure 14:
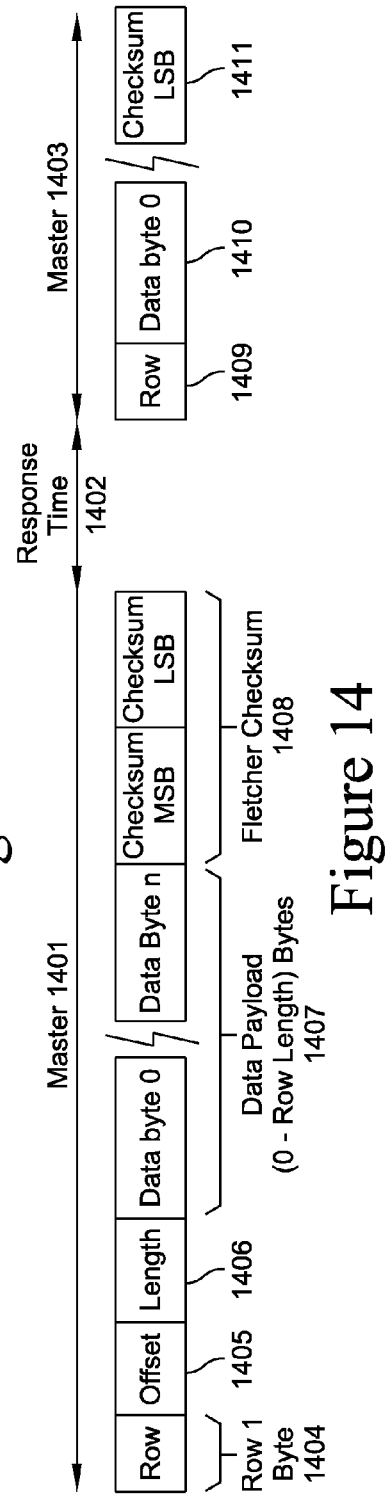
FIG. 14 is a block diagram of a slave message format according to another embodiment of the present invention.

Another transaction type includes a write operation from the slave system to the master. An example of such a message transaction is shown in FIG. 14. A slave system sends a message 1401 to a master system, and after some response time 1402, the master replies with a message 1403. In the case of a write operation, the master may reply to the slave indicating the row address written by the write operation, indicating to the slave that the write operation was successful. To this end, the message 1403 from the master may include row information 1409, one or more data bytes 1410, and any checksum information 1411.

In summary, the slave sends messages (e.g., ACK messages) to retrieve row information stored in a memory of the master. The master determines which row of data to transmit next, and the master eventually transmits the entire set of data. As described below, such information may be stored in the master according to a memory map described below.

Memory Map

According to one aspect of the present invention, the master may include a memory map in which configuration and performance data are stored. For instance, data may be stored in one or more rows of a memory map as shown in FIG. 15. As is shown, the memory may be a linear array of memory organized in rows. In one embodiment, the master defines a shared memory format. As shown in FIG. 15, the memory may be referenced in a linear array as indicated by the offset shown in the cells. For example, row 0 contains data at offset 0x0000-0x0007. A slave or other entity that reads the memory map may issue commands to the slave that "walks" through the memory map to provide all of the information stored in the memory map. Alternatively, the slave may selectively request particular information from the memory map if the location of the data is known.

According to one embodiment, the memory map may include data that defines the format of the memory map, and its contained data. In one example, the memory map includes header information that defines the data contained in the memory map. Such header information may be stored in reserved locations (or offsets) in the shared memory map, permitting a slave to discover communication parameters for communicating with the master. Further, the header may contain information describing the contents of the shared memory. In the example memory map shown in FIG. 15, the header may be defined as offsets 0x00-0x08.

Figure 16:
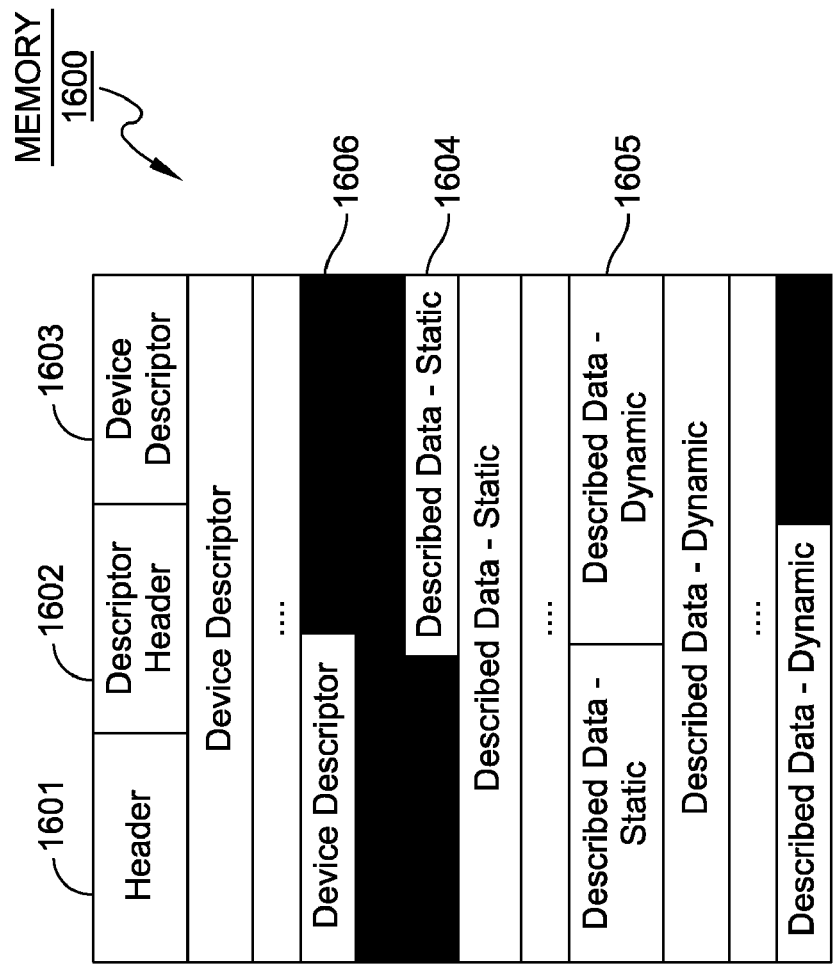
FIG. 16 is a table showing an example memory map according to another embodiment of the present invention.

The memory of a master device may contain several regions. For example, FIG. 16 shows an example master memory having different regions that may be accessed by a slave device. According to one aspect of the invention, the memory (e.g., memory 1600) includes a header 1601 that includes information for establishing communication and accessing other portions of the master memory. In one example, header 1601 has a standard format that slaves and other entities can identify communication parameters contained therein and therefore may communicate with the master device. An example header format is shown by way of example in FIG. 17 and discussed further below. The header 1601 may be a publicly-accessible area that may be accessed by devices to determine communication parameters. In one specific implementation, header 1601 is 8 bytes long.

In one embodiment, the header is a required data region, from which other communication parameters are determined. Specifically, header 1601 may indicate, for instance, a version of a communication protocol to be used to access the master. Header 1601 may also specify the organization of data in the memory map, the regions that are contained within the map, and aspects of their organization. In one specific example, the header includes a unique identifier that identifies a data structure of the memory from a group of known configurations. Further, the header may include information identifying the number and size of data packets used in communication.

Following header 1601, memory 1600 may include a descriptor header 1602 that indicates, for example, an indicator (e.g., a pointer) that identifies where data may be found within memory 1600. For example, the descriptor header 1602 may include a pointer that indicates a beginning of described data. Descriptor header 1602 may include other information, such as an indication of parsing rules to be used to parse a device descriptor 1603 that follows the descriptor header 1602.

Device descriptor 1603 may provide a number of functions, including identifying which rules for parsing the descriptor may be used by slaves that access the master. Device descriptor 1603 is, in one embodiment, a series of bytes that describe the format of the described data. According to one embodiment, device descriptor 1603 is encoded and decoded using a set of rules. One purpose of the device descriptor, according to one embodiment, includes informing slaves as to which usages of the data (e.g., a data element) are implemented, where a particular usage exists in the memory map, any parameters for particular usage, and where a particular usage exists in the device hierarchy.

Memory 1600 may be divided into sections of described data that are either static (e.g., static data 1604) and dynamic data (e.g., dynamic data 1605). According to one embodiment, if no distinction is made, the described data may be considered dynamic. According to one embodiment, a split is made between data types to aid the slave in determining how to most efficiently store data received from the master. Such described data may include meaningful data for the master entity including, for example, operating parameters, debug information, performance information, etc. The described data may be located in any portion of memory 1600, and is not limited to following immediately after the device descriptor 1603. For example, memory 1600 may include one or more portions of undescribed data (e.g., data 1606) that is included for padding purposes or other use.

Static data is data that changes infrequently, for example, information describing the master configuration. The described data may also include data which changes frequently, such as performance information.

FIG. 17 shows an example header format according to one embodiment of the present invention. The header may include protocol version information that identifies a version of the protocol being used. The header may also include row length information that identified the length of a row contained in the memory map. The row length may also define a packet size for communicating to the master from a slave or proxy entity. The header may include an identifier that indicates the number of rows of memory in the memory map.

The header may include information identifying the master entity. This information may be, for example, a unique identifier for a particular model of a master device. Such information may be useful to a slave for identifying what capabilities a particular master may have. In one instance, the slave may be a personal computer (PC) that manages a master device, such as a UPS, and thus the model number of the UPS being managed may be useful for determining the commands that may be performed, information that may be monitored, etc.

The header may also include an identifier that indicates a particular data table configuration format. This identifier may permit, for example, a slave to identify a particular configuration of the memory map. This identifier may also allow a slave device to determine whether the slave supports a particular memory map configuration. That is, the slave may store different memory map configurations, and the slave may use a particular configuration in response to the identifier. Further, the header may identify what protocols and/or features are supported by the master, allowing a slave to adequately determine the master's capabilities. The header may also include a human-readable description of the device for use, by an administrator or other user, or any other information describing the device and/or method for accessing the device.

According to one embodiment, the device descriptor is a sequence of bytes, which describes the format of the described data. The device descriptor is encoded and decoded by following a set of rules as discussed further below.

According to one embodiment, the purpose of the device descriptor is to let slave devices know:
Which data usages are implemented by a master.
Where a particular usage exists in the memory map of the master.
Any parameters for a particular usage.
Where a particular usage exists in the master device hierarchy.

The following terms are important for understanding the following example implementation of descriptors:
XML—A well-known markup language that may be used to describe the master memory format.
Namespace—A dictionary that defines collections and usages related to a given function.
Collection—A container for usages, other collections and collection arrays.
Collection Array—A container for usages and other collections that repeat. Collection arrays may be used to collapse identical collections that would otherwise be repeated (e.g., three phases of input voltage).
Usage—A data element. Usages are the basic building block for defining the master memory.
Operator—A special byte used in the device descriptor. Operators are used to provide a set of rules for parsing the device descriptor.
Fully Qualified Name—Provides the complete hierarchical path to a collection or a usage including namespace(s).

A namespace is unique and can have IDs from 0 to 223. In one example, there are two namespaces that are defined uniquely for a product/series ID identifying the product and series of a master device. These namespaces are referred to herein as Factory0 and Factory1 and have IDs 0 and 1, respectively. These Factory namespaces can be defined uniquely for each product, and therefore, the limit of information contained in each product namespace may not be exceeded.

According to one embodiment, collections defined within a namespace are unique and are assigned IDs from 0 to 223. According to one example, collection IDs 0 through 3 may be "reserved" in all namespaces. Collection arrays may be assigned the same IDs range as collections.

According to one embodiment, usages within a namespace are unique and are assigned IDs from 0 to 223. The definition of a usage may define the size (or the maximum size) and the scaling factor (if applicable). Usages only have meaning when they are referenced by their fully qualified name.

A pictorial representation of the master memory can be represented in a hierarchical tree as shown below in Table I. This tree helps to illustrate the relationship between namespaces, collections and usages.

TABLE I

| Fully Qualified Usage Name | |
| --- | --- |
| Descriptor for Data | Fully Qualified Name |
| Namespace <namespace1> | |
|   Collection <collection1> | |
|     Usage <usage1> | namespace1:collection1.usage1 |
|     Usage <usage2> | namespace1:collection1.usage2 |
|   End <collection1> | |
|   Collection <collection2> | |
|     Usage <usage1> | namespace1:collection2 |
|     Collection <collection3> | |
|       Usage <usage3> | namespace1:collection2.collection3.usage3 |

TABLE I-continued

Fully Qualified Usage Name

| Descriptor for Data | Fully Qualified Name |
|---|---|
|     End <collection3> | |
|   End <collection2> | |
|   CollectionArray <collection4> <no of elements> | |
|     Namespace <namespace2> | |
|       Usage <usage4> | namespace1:collection4[index].namespace2:usage4 |
|     End <namespace2> | |
|       Usage <usage5> | namespace1:collection4[index].usage5 |
|   End <collection4> | |
| End <namespace1> | |

Because, according to one embodiment, slaves build the entire path to a usage, it would be beneficial to have consistency in hierarchical trees of usages across products. To facilitate this, each product may adopt one of a set of predefined hierarchies. To document and provide a method for simulating a master device, certain files describing the memory of the master may be created. For example, such files may be in XML format.

According to one embodiment, the device descriptor immediately follows the descriptor header. The length of the device descriptor may vary depending on the application. Information in the descriptor may fall into one of three types of information:

Operator—A special character that gives special meaning to bytes following the special character. A table of operators is listed below in Table II.

Operator Parameters—A byte or series of bytes that have meaning based on the operator that preceded the parameters.

Usage—A single byte that represents the ID for a specific usage. Any byte that is not an operator or an operator parameter is a usage.

When parsing the descriptor, every byte may be assumed to be a usage unless that byte is an operator or operator parameter. According to one embodiment, operators are values in the range 0xE0-0xFF inclusive. The range of valid usage IDs may range from 0x00-0xDF to allow for future expansion, and the Collection ID and Namespace ID values may be limited to a similar range for clarity and the possibility of future expansions. Table II below details example operators that may be defined.

TABLE II

Example Device Descriptor Operators

| Operator Name | Value | Parameters | Description |
|---|---|---|---|
| END | 0xFF | No parameters | This operator represents the end of a namespace, collection and collection arrays. |
| COLLECTION | 0xFE | <Collection #> | This operator represents the start of a collection. May be terminated with an End operator. |
| COLLECTION ARRAY | 0xFD | <Collection #> <# Array Elements> | This operator represents the start of a collection array. May be terminated with an End operator. The collection number and the array size each are 1 byte. Collection arrays are 0 indexed, meaning the first element is considered element 0. |
| SIZE | 0xFC | <Size in Bytes> | This operator indicates the size of the last usage in the device descriptor. The size in bytes parameter is a single byte. |
| BITMASK | 0xFB | <Bits Implemented> | This is a binary mask that is the same size in bytes as the usage. A bit set in the mask indicates that a bit is implemented in the particular application or is writeable if the usage is writeable |
| MAXMIN | 0xFA | <Max><Min> | This operator indicates the max and min values of a writeable usage. The size in bytes of Max and Min are the same as the usage. |
| DEFAULT | 0xF9 | <Default> | This operator indicates the default value of a writeable usage if applicable. The size in bytes of the default will be the same as the usage. |
| NAMESPACE | 0xF8 | <Namespace> | This operator represents the start of a namespace. May be terminated with an End operator. |
| NOP | 0xF7 | No parameters | NOP is a dummy fill byte for the device descriptor. Slaves may skip to the next byte when this operator is encountered. A master may use this for padding so that the descriptor length would be constant from one SKU to another. |
| END DESCRIPTOR | 0xF6 | No parameters | This operator indicates the end of the device descriptor. |
| SKIP | 0xF5 | No parameters | This operator is an indication for the slave to skip the next usage and its parameters. |

TABLE II-continued

Example Device Descriptor Operators

| Operator Name | Value | Parameters | Description |
| --- | --- | --- | --- |
| RESERVED FOR FUTURE USE | 0xE2–0xF4 | | Reserved for future use. |
| INTERNAL RESERVE | 0xE1 | No parameters | This byte is not be transmitted to the slave. For the master, this is an indication of an escape sequence (e.g., for internal use only). |
| ESCAPE | 0xE0 | <operator> | This operator indicates that the following byte is the actual operator. This is reserved as future proofing in case additional operators are required. |

Each usage is defined as one of the following data types. Each data type has a series of parameters associated with its definition, each of which reside with the usages in the appropriate XML file(s). Each usage may include one of the following access attributes:

Read Only: A usage with this attribute can only be read by the slave.

Read/Write: A usage with this attribute can be read as well as written by the slave.

Read/Factory Write: A usage with this attribute can be read by the slave but if authenticated by the factory password then the slave can write to this usage as well.

According to one embodiment, each usage may include only a single one of the above access attributes. Unique usages may be created if different access attributes are needed.

Thus, a usage as defined in a publicly-accessible location may permit a slave system to access certain information stored in memory of a master. In a similar manner, the slave device may access such information as part of a proxy system that may provide access from other devices or systems.

Proxy System

According to one embodiment, a slave may act as a relay for the purpose of relaying information to one or more other entities. To this end, the slave may be a part of a proxy system that is configured to communicate with other entities, such as a computer system. Such a computer system may be coupled to the proxy through one or more communication networks.

According to one aspect of the present invention, the proxy is adapted to communicate on behalf of multiple devices to a single master. In one embodiment, the protocol used between the master and slave is transported using a network protocol. Conventionally, master devices such as UPSs usually communicate to a management entity using a directly-connected link (e.g., a serial communication cable) or are provided what is referred herein as a network management card (NMC), interface card, or other devices that communicate to the device using the native language of the device, and this device translates data to one or more other systems or devices using network protocols such as HTFP (e.g., over one or more networks).

Currently, products such as UPSs and other devices communicate to other devices over an Ethernet-based network through either of two methods. First, an interface card (e.g., an NMC, communicates to the UPS or other device in the native language of the UPS or other device, translates this data to client-friendly terminology and vocabulary, and communicates over the Ethernet-based network to one or more other devices (e.g., a client) using one of many protocols such as HTTP, Telnet, SNMP and others. A client interpreting the translated data can be a human using a network browser or an application programmed to implement processes in response to the UPS or other devices' state of condition.

The disadvantage of this approach is that the interface needs to understand the UPS or device to which the interface is communicating so that the interface can translate its language to the client-friendly interface in a meaningful way. Using this approach, the interface card needs to store in its memory not only the many different languages of the different UPSs and devices the interface card expects to translate, but the languages of the different clients that the card can be configured to transmit that translated data. Because of the need for multiple-language support requirements of both the device and the client, physical memory requirements of the interface card are increased. Also, because this translation occurs in real-time, the processor performing the translation needs to be fast enough to reduce lag time to an acceptable amount. Both of these requirements add to the cost and complexity of the interface card hardware.

Another way by which a connection is formed includes a software application installed in a computer that connects to the UPS or other device through a serial connection, translates the UPS or other device data to client-friendly terms and makes that data available to other devices through an Ethernet-based network connection. One disadvantage of this approach is that the approach requires a PC or other computer connected to the UPS or other device via a serial connection. The computer is obviously an expensive, voluminous, and power hungry piece to this solution if it were not intended to be used for other purposes such as file-serving, print management, and other network activities. This approach also requires that a serial port is to be available to communicate to the UPS or other device, which is not always possible or practical. Further, conventional discovery of devices requires polling of all network (e.g., IP) addresses to "find" nodes that contain network devices. Such discoveries are time intensive due to the number of possible IP addresses, and resource intensive due to the network bandwidth required to perform such operations.

According to one embodiment, a system is provided that does not need to translate data from the UPS or other device before providing it in client-friendly formats over the network. Because data is not translated, but is provided in its native form, the complexity of the code and the hardware is reduced. A side benefit of passing data through the interface in its native form is that the system works with a broad array of products without the system needing to store multiple protocols or otherwise having to know anything about individual capabilities and features of different master devices. Another advantage over conventional interface cards is that the system, according to one embodiment, is designed to work with only main network protocol. In contrast to a conventional network card which has to store the protocols of several network communication methods in memory, the system according to one embodiment of the present invention uses only one. Support for a single protocol reduces cost and complexity and simplifies set-up time during product installations. According to another embodiment, a lightweight protocol is provided that allows a software client to perform a simple network broadcast and receive a response from all devices on the network that comply with this protocol.

According to one aspect of the present invention, a universal translation system is provided. In particular, a single device is provided that for all master devices compliant with the serial and network protocol regardless of the data that is specific to the master devices. Further, a capability is provided for discovering devices on the network that are compliant with the protocol. This may be accomplished, for example, via a lightweight communication method. In one particular example, existing communication protocols are utilized as a transport layer for a proprietary serial protocol. The data received at the software client is the same format as the data that would have been received through a direct serial communication with the master.

As discussed, a network version of a serial link protocol may be provided. According to one embodiment, the protocol allows access to the same memory map that is accessed over the serial port of the master. In one embodiment, the protocol is a lightweight network protocol that functions as a serial cable replacement. The added advantage of the network protocol is that multiple devices may connect to the same network master, with only one connection to the master.

Figure 18:
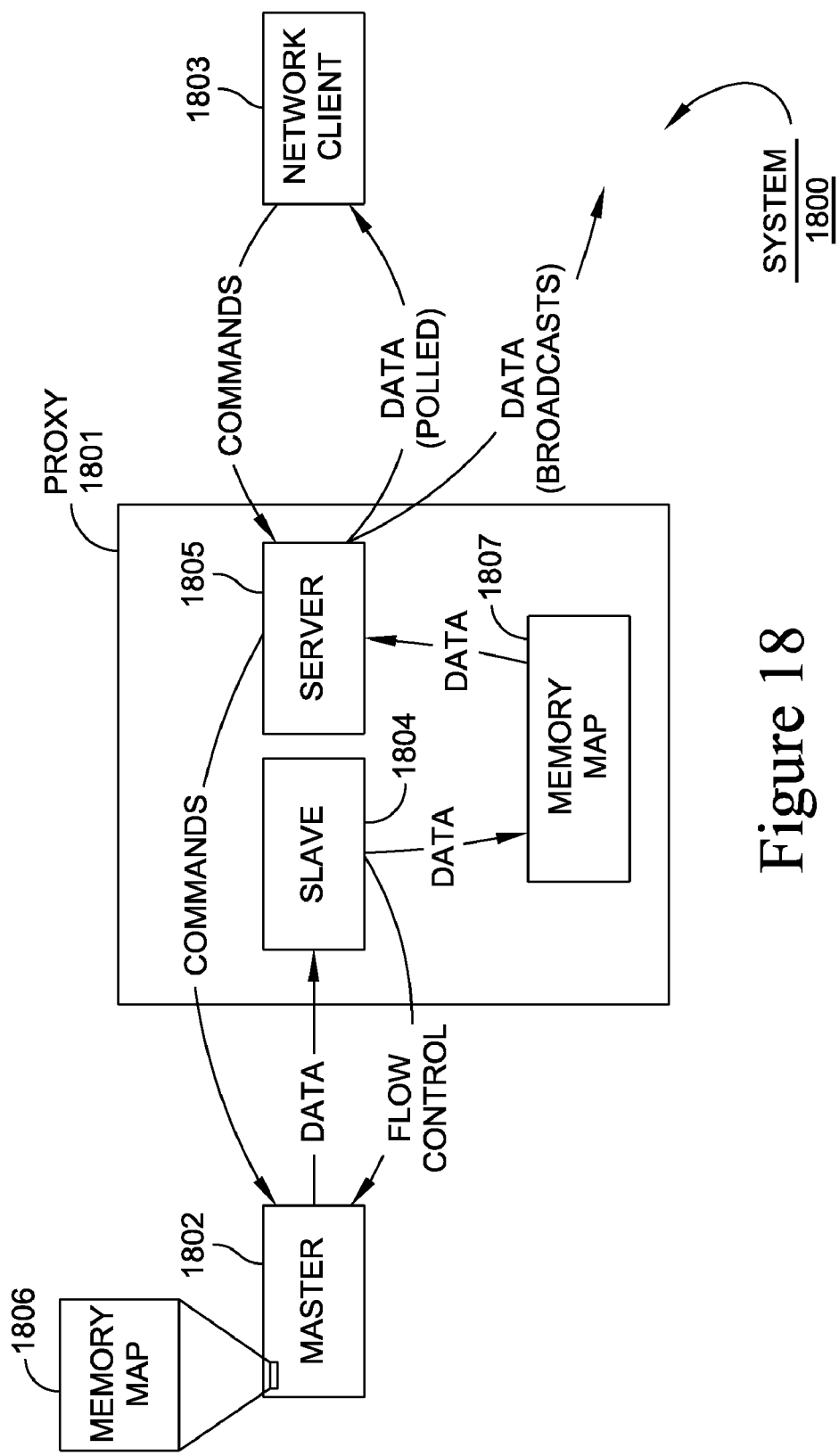
FIG. 18 is a blocking diagram of a proxy system according to one embodiment of the present invention.

FIG. 18 shows one example system used for communicating with a master device according to one embodiment of the present invention. Communication system 1800 includes a master system 1802 having information to be relayed to other entities. More particularly, master 1802 may include one or more memory areas to be accessed by one or more external devices. Master 1802 may include a memory map 1806 that includes the data to be accessed. According to one embodiment, memory map 1806 may include data that describes the format of other data contained within the memory map. A slave, proxy or other system may use such information in the memory map to determine communication parameters for communicating with the master 1802.

According to one embodiment, a proxy 1801 is provided that is capable of reading the memory map 1806 of the master 1802 and providing the information to one or more clients (e.g., network client 1803). To this end, a proxy 1801 includes a slave 1804 that is capable of communicating with master 1802. As discussed, slave 1804 may communicate commands and other data to master 1802 over a serial communication link. Such information may be, for example, messages as discussed above with reference to FIGS. 10-11. Such information may include commands, data received from a master, and any flow control information.

Data retrieved from the master may be stored in a copy of the memory map of the master stored in the memory of proxy 1801. More particularly, memory map 1807 may be a local copy of memory map 1806 of master 1802. Slave 1804 may periodically read the memory map of master 1802 and update its local copy. Thereafter, other systems may be capable of accessing information stored in the local copy of the memory map 1807. Such access may be provided, for example, by a server 1805 which is capable of communicating over one or more communication networks to other systems, including network client 1803. According to one embodiment, server 1805 may permit clients to communicate with the master 1802 using one or more conventional network communication protocols.

In one example, server 1805 permits communication with the master using the well-known User Datagram Protocol (UDP) protocol. The UDP protocol uses the well-known Internet Protocol (IP) to deliver datagrams. In yet another example, the well-known Simple Network Monitoring Protocol (SNMP) may be used to access data stored in the master 1802. More particularly, server 1805 may communicate with external clients via standard SNMP methods such as get and get next requests, traps, etc. and may communicate to the master 1802 such information through, for example, slave 1804 and memory map 1807.

Although SNMP may be used as a transport layer protocol for communicating data between a client and a server, it should be appreciated that any other protocols may be used, and the invention is not limited to any particular protocol. Rather, any protocol that is capable of transferring command information between a client and server may be used. Further, such a protocol may be capable of transferring data pulled from the server or data which is generated by the server in an unsolicited manner (e.g., a broadcast).

As discussed above, network client 1803 may include one or more systems that are capable of communicating commands and data to a master (e.g., master 1802). Client 1803 may be, for example, a management system capable of monitoring one or more devices (e.g., a UPS). In one example, network client 1803 may be the well-known ISX manager product available from the American Power Conversion Corporation. Some clients may be capable or reading and/or writing to memory locations within memory map 1806 of master 1802. As discussed above, one or more portions of memory of master 1802 may be accessed, including static data and dynamic data. In one example, static data does not change and may be transmitted to proxy 1801 upon communication with the master 1802. Dynamic data may be communicated periodically or as requested by proxy 1801.

Major features of a serial protocol may be duplicated in a networked version of the serial communication protocol system. That is, a network protocol may be used as a transport to conduct the serial communication protocol over a network. According to one embodiment, the "networked" version of the serial protocol may be substantially similar to the serial communication protocol used between a slave and a master. This feature may be beneficial, as client software that is capable of communicating with a master devices as a slave (e.g., using a serial link) may be nearly identical to that of software that communicates through a proxy and associated network transport protocol. The following describes differences between a serial version and the networked version of a serial protocol according to one embodiment of the present invention.

As discussed above, the SNMP protocol may be used as a transport-layer protocol for transmitting information between the proxy and a network client. In one particular example, a proxy device communicates the master slave memory map to a network client using two tables of SNMP OIDs. In one particular implementation, the static table includes one row for each block of static data in the master. A row can contain a maximum of approximately 1500 bytes of data, and the proxy device determines the number of rows in the table required to transmit the serial master static data. A dynamic table may be constructed in the same manner. A network client reconstructs the memory map by concatenating the static rows with the dynamic rows to make one contiguous block of memory.

The slave in the proxy device unlocks the serial protocol so that a correct version of the memory map resides in the proxy server. To recreate the "authentication protocol", the proxy device may implement two tables of clients, a monitor client list (e.g., a "read only" list), and a shutdown client list (e.g., clients having both read and write access).

A "shutdown client" is, in the case of a UPS master device, a software client executing on a PC or server to which the UPS is being controlled. For instance, it may be desired to shut down a UPS from a server to which the UPS provides output power. To this end, the network may issue one or more commands that affect the operation of the UPS. Thus, it may be necessary to provide write access in addition to read access to portions of the master memory. According to one embodiment, addition of a client to either table requires registration using the authentication protocol. Any client on the network may communicate with the proxy server, but certain pieces of information are "restricted", and are not reported to the client unless the client is registered in one of the two registration tables.

Each table may contain a fixed number of entries; each entry referred to herein as a slot contains the IP address, MAC address and a timeout value in seconds. The timeout is reset, for example, with each SNMP communication packet from the client to the proxy. Communications with the proxy is allowed as long as the timeout has not expired and the client is defined in one of the registration tables. The timeout may be set to, for example, 600 seconds for shutdown clients and 3600 seconds for monitor clients. When the timeout expires, the device is removed from active registration, but its IP and MAC addresses may be stored in a memory of the proxy. If the device re-establishes communication, the proxy server may provide the same slot or entry previously provided.

A slot is occupied if the slot has defined IP and MAC address. One way to completely remove a client from the list is to actively register for the particular slot, or to be registered on a different slot and clear a slot. Addition of a client to a registration table is accomplished, for example, by writing the serial authentication with a slot number to the appropriate OID (e.g., registration list OIDs). The format of the data to be written may be a hex string <Serial Slave Password Challenge><Serial Master Password Response><16-bit Slot Number>. A slot number having a value of 0 requests the proxy to pick an available slot, or to reassign a slot previously registered to the same client. If the table is full, an error may be returned. In the case of a full table, the client must decide to refuse connection, or bump another client by registering for a particular slot.

The first table, the shutdown client table, is intended for management entities and shutdown clients to register. Devices in this table receive periodic updates of the dynamic memory and are allowed to read and write to the serial memory. Once listed in the broadcast table the proxy device sends SNMP traps to the network client on a specified interval, and upon receipt of a valid write command. Registered clients may, according to one embodiment, receive exactly the same memory map images. The network client is responsible for renewing the registration periodically to prevent the registration from timing out. Renewal of the registration may be performed, for example, by any valid SNMP communication to the proxy device. In another embodiment, a polled read of the registration table may be performed to renew the registration with the least impact to the proxy server.

The second table, the polled table, may be provided for entities that periodically poll the proxy (e.g., a management server or other monitoring software that communicate on a polled basis to the proxy). These devices may be permitted to register in a separate table with a similar registration method described above.

As discussed above, data in the master is organized into two basic regions, a static region followed by a dynamic region. The static region contains data that changes infrequently and can be communicated without any authentication. The proxy server may store data in this region in memory (e.g., in ROM). If placed in ROM, care should be taken not to place data that changes frequently, as the ROM in most devices have 10K write limitations. The dynamic region may include all data within the memory map that is not static. Dynamic data may optionally be masked to a network client by replacement with a constant piece of data when the network client is not a registered client. According to one embodiment, data needed by the network client to generate the registration may not be masked.

If a device is not registered, the device may be provided "garbage" dynamic data. Data from the proxy device will be valid with the exception of the dynamic data. According to one embodiment, the only data in the dynamic data that will be valid is the data necessary to properly generate the registration packet.

As discussed, the proxy device may provide a "universal translator" to multiple device types. According to one embodiment, the proxy functions as a transparent protocol translator. This function is achieved by placing restrictions on the master devices that are supported by the proxy. According to one embodiment, requirements may be imposed on master devices that allow them to work with the proxy server. For example, all devices that are designed to work with the proxy device may be required to implement the device descriptor. If registration is to be used, the authentication protocol must also be used. A device that fails to implement all the required usages may be declared to be incompatible by the proxy device.

Because, according to one embodiment, the transport protocol for the serial communication protocol is SNMP, the data being transmitted is communicated using SNMP OIDs (Object Identifiers). In one example, each packet of information is completely defined within the definition of the OID. There may be several groups of OIDs that are supported for a networked version of the serial communication protocol.

More particularly, a group of OIDs may be provided that communicate the memory map to the network client, and allows for commands by the network client to the master device. The data resides in an SNMP table so that a single proxy may serve multiple master devices. To reconstruct the original memory map, the network client may concatenate the static and dynamic data. However, according to one embodiment, to provide access to the master memory map, the proxy and its network clients must be authenticated.

Authentication Protocol

According to one embodiment of the present invention, it may be beneficial to prevent unauthorized vendors from making products that communicate with a particular master device (e.g., a UPS), and prevent other device manufacturers from making a master device that communicates with a particular slave device. For instance, in the case of a UPS master device that communicates with a particular slave system, it may be beneficial to prohibit "knock-off" master and slaves from entering the marketplace. To this end, a protocol is provided to prohibit either an unauthorized master or slave (or its network clients) from communicating with an "approved" master or slave entity.

Prior communication methods assume that the master entity is an approved one. That is, security measures are taken to prohibit unauthorized slaves from controlling a particular master. However, such security measures do not ensure that the masters or slaves are themselves compliant, and therefore, such master and client devices may be easily reproduced.

According to one embodiment, additional methods are provided for verifying that the master is an authorized master. For instance, an additional verification method may be provided to allow a slave, proxy, or client to determine whether a particular master is "authorized." Further, a method may be provided to determine whether a master is in a locked or unlocked state.

Also, because the information contained in the device (e.g., status, control, and configuration information) can be viewed, modified and controlled via a serial communication link that is accessible to external devices, it is possible that someone or some company, may write software that uses the communication protocol to communicate with a master device. It is also possible that someone, or some company, could reverse-engineer the communication protocol and build a master device (e.g., a UPS) that duplicates the protocol and works with software tools. According to one embodiment of the present invention, a "lock" mechanism is provided that blocks meaningful data from being transmitted from the device unless an unlock sequence of data is sent to the device. The unlock sequence is based on an algorithm performed on data transmitted via the serial link.

According to one embodiment of the present invention, a method is provided that ensures that authorized slave devices communicate with a master and ensures that only authorized master devices communicate with a slave. Authentication is guaranteed, according to one embodiment, by implementing an unlocking algorithm at the master along with bidirectional authentication implemented by the slave and master. The authentication algorithm may be tracked with a version number so that changes can be made to the algorithm should the existing algorithm be compromised or otherwise be considered inadequate.

According to one embodiment, a master always send data in response to a slave request. However, the data is masked if the master is in a locked state. When data is masked, the data is ignored by the communicating software (e.g., a slave, or client accessing the master through a slave). According to one embodiment, an authentication protocol may include the following features:

Bi-directional locking key—The master (e.g., a UPS) only communicates with authorized slaves, and slaves can detect an authorized master. When the master is locked, the master only allows data to be written to a public memory section (e.g., of EEPROM or to public rows of RAM). Other data writes are not permitted. The slave is adapted to ignore communications from devices that are not verified as authentic master devices.

Method for detecting data status—The slave may be able to detect whether data is locked or unlocked to determine whether the data being returned from the master is valid.

A locking feature according to one embodiment utilizes the fact that there are two types of data that are transmitted, public and private. Data that is public is always available, and data that is private is only available after an unlocking sequence is sent to the master. In one example, the master, according to one embodiment, generates a "secret key" automatically on power up, and whenever the master exits factory mode. This secret key may be, for example, 16-bits long and calculated, for example, based on an 8-bit Fletcher checksum algorithm performed on specific elements of the master memory map.

According to one embodiment of the present invention, a Fletcher checksum may be used to verify the integrity of the transmitted data. For instance, an 8-bit Fletcher checksum may be used. One example of the Fletcher checksum algorithm is defined in the IETF document RFC 1146 for use with the TCP protocol.

The 8-bit Fletcher checksum is calculated over a sequence of data octets (call them D[1] through D[N]) by maintaining 2 unsigned 1's-complement 8-bit accumulators A and B whose contents are initially zero, and performing the following loop where i ranges from 1 to N:

$$A := A + D[i]$$

$$B := B + A$$

At the end of the loop, A contains the 8-bit 1's complement sum of all octets in the datagram, and that B contains $(N)D[1]+(N-1)D[2]+ \ldots +D[N]$. At the end of the loop, the A is placed in the first byte of the checksum field and B is placed in the second byte. Note that, unlike the OSI version of the Fletcher checksum, the above version of the Fletcher checksum does not adjust the check bytes so that the receiver checksum is 0. It should be appreciated that there are a number of much faster algorithms for calculating the two octets of the 8-bit Fletcher checksum, and any method for calculating a Fletcher checksum may be used.

Naturally, any computation which computes the same number as would be calculated by the loop above may be used to calculate the checksum. One advantage of the Fletcher algorithms over the standard TCP checksum algorithm is the ability to detect the transposition of octets/words of any size within a datagram. Although the Fletcher checksum may be used, it should be appreciated that other methods for checking data may be used.

A "shared secret" may be combined with elements of the public memory map, and may be used to initialize an algorithm used to generate the "secret key." In one example, the algorithm may process a set of particular bytes from the master's memory map. These processed bytes may be referenced to particular elements in the memory map or may include the data located at a particular position of the memory map. The "shared secret" according to one embodiment of the invention includes the elements that are used to generate the "secret key."

According to one specific embodiment of the invention using a Fletcher checksum algorithm, the shared secret may be used to initialize both bytes of the Fletcher checksum prior to calculating the Fletcher checksum of the first X bytes of the master memory, followed by Y bytes of data starting with the serial number of the master, where X and Y are shared secrets. According to one embodiment, all data included in the calculation of the "secret key" is public and can be retrieved without knowledge of the "secret key". To generate the secret key, knowledge of the initializer for the Fletcher checksum and the number of bytes of data X and Y are required. The initializer and the number of bytes of data may, for example, be determined at compile time during the design of a specific product. According to another embodiment, the calculated "secret key" is not transmitted with the exception of one cycle after the correct key has been transmitted to the master device.

To prevent unauthorized duplication of the master, the slave may send the master a random number to which the master applies a secret algorithm to generate a response. The response is sent to the slave and allows the slave to determine whether the master is authentic.

In another example implementation, the master may generate a random number which is added to the bytes of the "secret key" to generate a simple checksum. This simple checksum with the random number may be transmitted periodically from the master so that the slave can verify that the device with which it is communicating is an authorized master.

To allow the slave to determine the status of the master (locked or unlocked) information (e.g., one or more bits) in a specific response indicates the master data status and may be transmitted periodically to the software. The slave may inspect this information to determine if the responses to queries are valid.

On microprocessor reboot, and on loss of communications, the master may change its data status to a locked state. When in locked state, locations having data that is private may be transmitted with random, fixed, or garbage data in lieu of transmitting the private data. The transmitted data may be ignored by the communicating slave. The master becomes unlocked, in one specific example, when a specific 16-bit sequence is written to the master registers. When the appropriate key is sent, the master acknowledges the data and then proceeds to transmit all private data as valid.

Whether the master data is locked or unlocked, the master may transmit a random number followed by a simple checksum of the random number, the MSB of the 16-bit secret, and the LSB of the 16-bit secret. A slave device can interrogate these two bytes to determine if the master is an "authorized" master. The slave may lock the data in the master at any time by sending an incorrect secret key to the master. This receipt causes the master to "lock" the data.

Authentication also permits access to private data (e.g., parameters) within the memory map of the master, so additional usages need not be defined for special access to the master.

PUBLIC DATA Master memory elements that are publicly available.

PRIVATE DATA Master memory elements that are "masked" when the memory is in a locked state.

LOCKED Master memory status prior to authentication. Private data is unavailable when in a locked state.

UNLOCKED Master memory status after authentication. Private data is available when in an unlocked state.

As discussed, FIG. 16 shows an example representation of a master memory 1600 identifying the data located in different regions. In the example described above with reference with respect to FIG. 16, described data that is static is public data and therefore is available to clients that are not authenticated. Described data that is dynamic is private data that is not available to clients that are not authenticated.

According to another aspect of the present invention, a challenge/response method may be used to perform a bidirectional authentication between a master and a slave. In particular, another example process for performing a bidirectional authentication between a slave and a master device may be performed as follows:

Upon initialization after hardware reset (or after stop command received from a slave, data is locked and the master transmits only public data. This public data includes a Master Password Challenge (MPC). In one example, the MPC is a random number. To increase security, the master should attempt to make this number as random as practical for its application. Also, to further increase security, the use of constant numbers and incrementing the previous random numbers should be avoided.

When the slave receives row 0, the slave assumes that the master is locked. The slave waits to receive the last row from the master, ensuring that the password and authentication status usages have been received. The received authentication status usage is then checked to verify locked status of the master.

When locked, the master transmits the last row repeatedly (assuming ACKs) until the slave writes a Slave Validation Response, or SVR. In another implementation of the master, the master may choose to repeatedly transmit all public data.

The slave writes the SVR in response to the MPC (which is stored by the slave in its memory map). As part of the same write, the slave writes a Slave Password Challenge or SPC which also may be a random number.

Upon a write to the SVR/SPC, the master checks the SVR for validity. If valid, the master responds to the write with a Master Validation Response or MVR. The Master then begins transmission of all the private data including the authentication status usage, which shows that the master is unlocked. After successful unlocking, the master ensures that all rows have been transmitted at least once before the master reports data valid in the authentication usage. If the SVR is invalid, the master ensures that the master is locked. Any write to the SVR/SPC, whether valid or invalid, causes the master to update the MPC to prevent easily defeating the authentication.

Upon transmission of the row in response to the write to the SVR/SPC, the slave then checks the MVR for validity. If valid, the slave continues normal operation receiving the rows transmitted by the master up to and including the last row which confirms that all the data in the master memory is now unlocked and valid. If the MVR is invalid, the slave stops communications and takes an appropriate action. The appropriate action may be application-specific (e.g., alert user through GUI, stop communication for a period of X minutes, etc.).

Figure 19:
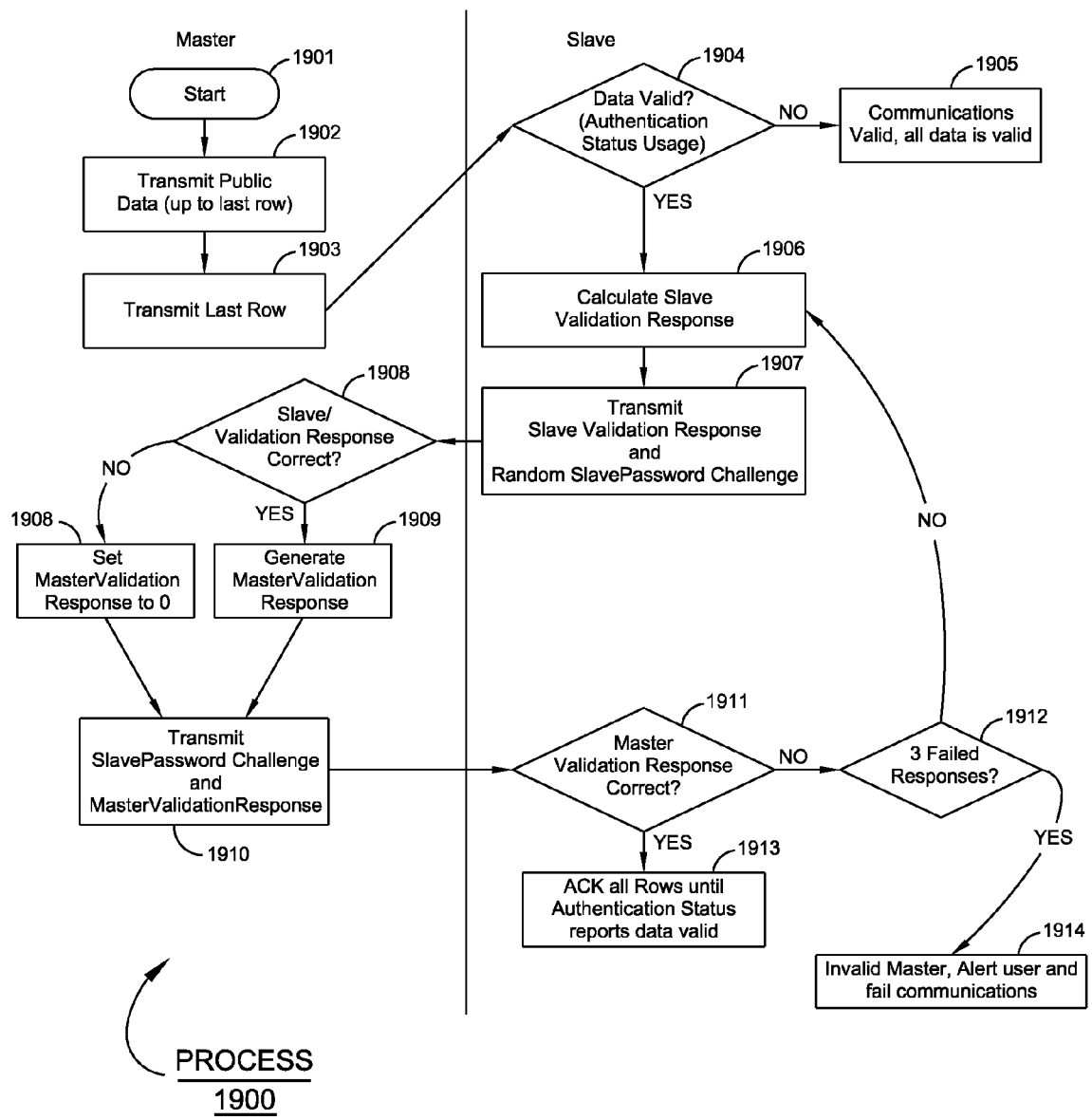
FIG. 19 is a flow chart of an authentication process according to one embodiment of the present invention.

FIG. 19 shows an example authentication process according to one embodiment of the present invention. At block 1901, process 1900 begins. At block 1902, the master transmits public data within the memory map. In one embodiment, the master transmits public data up until the last row of public data in the memory map. Upon receipt of the transmitted last row of data from the master at block 1903, the slave determines whether the received data is valid at block 1904. If so, slave determines a Slave Validation Response (SVR) at block 1906.

In one embodiment, the SVR is determined based on the Master Password Challenge stored within the memory map of the slave. However, it should be appreciated that the SVR may be determined by any other portion(s) of the memory map. At block 1907, the slave transmits the SVR and a Slave Password Challenge (SPC) which may also be a random number.

At block 1908, the master determines whether the slave validation response is correct. If so, the master generates a Master Validation Response (MVR) at block 1909. If not, the master sets the Master Validation Response to a value of zero. The master transmits the Slave Password Challenge and the determined Master Validation Response to the slave at block 1910. Also, the master may generate a new Master Password Challenge (MPC) when the Slave Validation Response is written or the master is initialized or reset.

At block 1911, the slave determines whether the Master Validation Response is correct. If so, the slave acknowledges all rows until the Authentication Status reports that all of the received data is valid at block 1913. If, at block 1911, it is determined that the Master Validation Response is not correct, it is determined at block 1912 whether a number of failed responses (e.g., a predetermined number such as 3) have been received. If so, the master is determined invalid, and communications with the master have failed. The slave may then alert the user (e.g., a client or proxy) and terminate communications at block 1914.

If, at block 1912, it is determined that a predetermined number of failures has not occurred, the slave may recalculate a new Slave Validation Response for transmission to the master. If the SVR is valid, the master will begin transmission of the private data. If not, the master remains locked.

According to one embodiment, the master populates the master password usage as follows:

The MPC is populated with the random number used to calculate the password.

The MVR is only populated as a response to the SPC being written with a valid value.

When the MVR is not populated, the MVR is set to 0x00.

According to another embodiment, the master populates the slave password usage as follows:

The master echoes the write from the slave.

Otherwise, the master populates this usage with 0x00s.

When locked, all private data is either not transmitted or reported as fixed values, (e.g., all 0x00s or all 0xFFs) to obscure the real data. In one embodiment, the private data is not in encoded form. The master, in one example, rejects writes to any private data when in a locked state.

To improve the security of authentication, the SPC should be different than the MPC. If not, the master should treat the SVR as invalid. Also, because the SVR and SPC comprise one usage, the master does not unlock on a write that does not properly include both sub-elements of the usage (same behavior as any invalid write).

Example Unlock Algorithm

The following is an example algorithm for calculating the SVR or MVR.

Note that, in the example below:

ULinkMem[ ] is populated with the image of master memory.

PROG_MODEL_NUM is the offset for the beginning of the model number in memory.

PROG_SERIAL_NUM is the offset for the pointer to the beginning of the serial number of the master.

PROG_MASTER_PASSWORD_LOC is the offset in master memory for the beginning of the master password.

```
UINT8 checksum[2];
// Initialize the checksum calculations with the appropriate ("SECRET VALUES")
   checksum[0]= uLinkMem[4];     // This is the MSB (byte 3 of uLink-memory)
   checksum[1]= uLinkMem [5];   // This is the LSB (byte 4 of uLink-memory)
// Do first X bytes of static data checksum, starting at byte Y
for(i=y;i<x;i++){
   checksum[0] = (checksum[0] + uLinkMem [i])%255;
   checksum[1] = (checksum[1] + checksum[0])%255;
}
// Calculate the offset of the dynamic data to include in the password
Offset=getROMword(&uLinkMem [SHARED_SECRET]);
// Include the Shared Secret data
for(i=0;i<(uLinkStatic[SHARED_SECRET_LENGTH]);i++){
   checksum[0] = (checksum[0] + uLinkMem [L_Offset])%255;
   checksum[1] = (checksum[1] + checksum[0])%255;
}
// Include the random 2 bytes of random data in the password usage
// generated by the Master
Offset = getROMword(&uLinkMem
[PROG_MASTER_PASSWORD_LOC]);
// Include the two bytes of the Master password challenge in the password calculation
```

-continued

```
for(i=0;i<2;i++){   // There are two more bytes to include
   checksum[0] = (checksum[0] + uLinkMem [i+Offset])%255;
   checksum[1] = (checksum[1] + checksum[0])%255;
}
```

In the example above, the $4^{th}$ and $5^{th}$ element of the memory map may be used to initialize the checksum. Any location of the memory map may be used to initialize the checksum. According to one embodiment, the serial number of the master may be used as the shared secret. In another example, the manufacture date of the master may be used.

According to one embodiment, the algorithm for determining the MVR may be the same as the algorithm for determining the SVR except that the SPC is used as the last two bytes instead of the MPC.

Factory password is used to allow modification of usages that are available only for factory use. Factory "mode" may be entered by modifying the secret password to the master. Exemplary modifications to the password to generate the factory password may include, for example, an offset added to the password, a bit shift operation, or an exclusive OR operation. For example, if the password is 0x3475 and an offset of 5 is used to generate the factory password, then the factory password is 0x347A.

Additional Protocol Support

According to one embodiment of the present invention, the master may assume one of two communication states—a communications active state and a communications inactive state. The master may be capable of supporting multiple communication modes while in the communications inactive state. However, according to one embodiment, only one communication mode may be active at a time. In an alternative embodiment, the physical layer of the master supports multiple simultaneous communications, and therefore, more than one communication modes may be supported.

Figure 20:
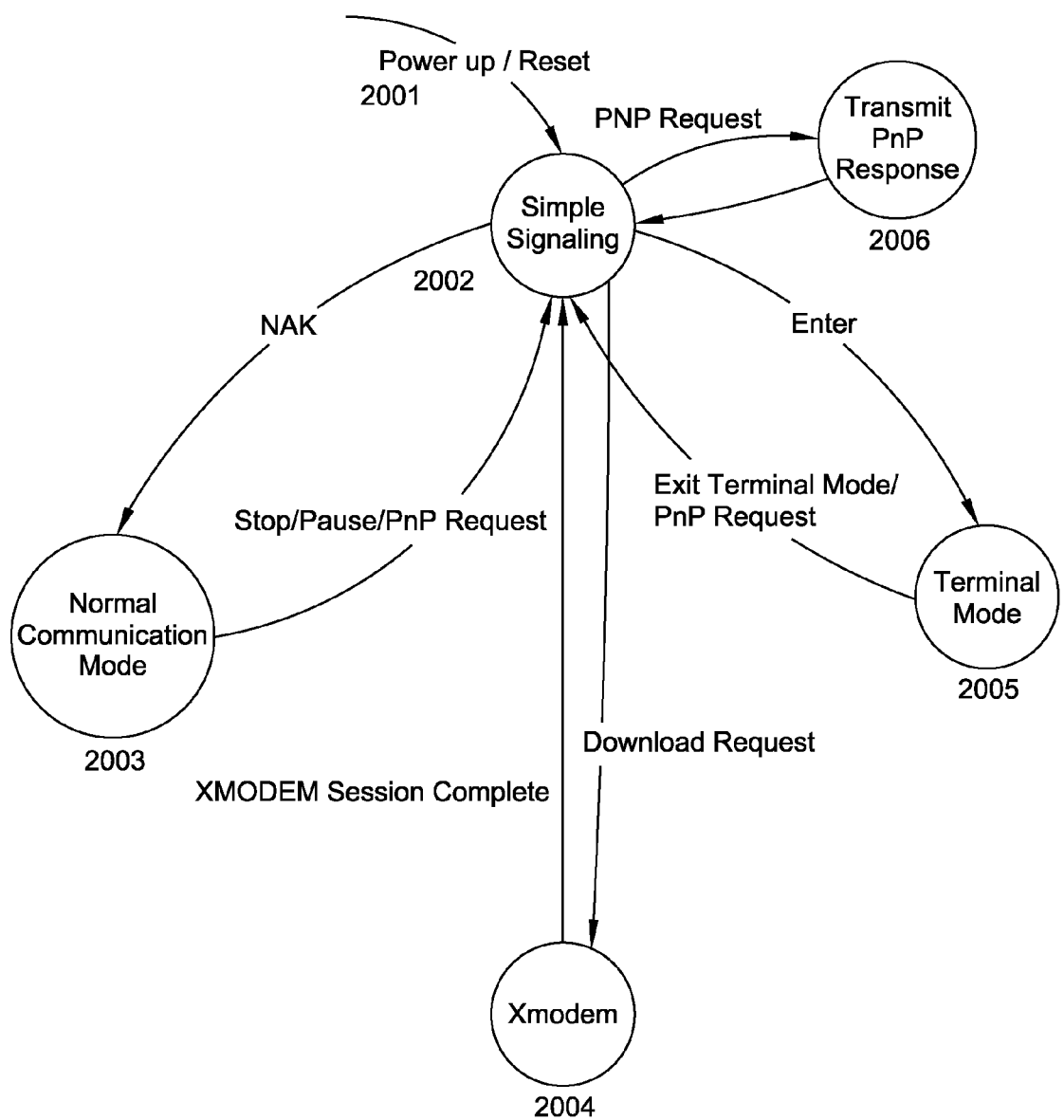
FIG. 20 is a process for performing alternate communication protocols according to one embodiment of the present invention.

FIG. 20 shows an example state diagram of a master that implements multiple communication modes. Additional communication modes supported by the master include, but are not limited to, a bootload mode, a terminal mode, and a file transfer mode.

In a communication state machine of the master, the state machine waits for a start character (NAK) prior to establishing communications. All other characters other than this start character are ignored. These ignored characters can be assigned, for example, as control characters that, when received by the state machine, cause the master to invoke one or more alternate protocols. FIG. 20 shows an exemplary system that which implements a standard communication protocol along with an XMODEM file transfer protocol, a terminal mode protocol, and a serial protocol (e.g., the well-known Microsoft plug-n-play serial protocol).

On a power up of the master, the master resides in state 2002 waiting for a protocol start character (e.g., a NAK character). Upon receiving the start character, the "normal" communication protocol will be invoked and the normal operating state 2003 will be entered. Upon exit from the normal communication mode (e.g., by a stop command, a pause, timeout or other mechanism), the master returns to an idle state waiting for one or more protocol start characters.

In one implementation, if a protocol has setup parameters (e.g., baud rate, bootload start of file, bootload end of file, filename for file transfer or other operational parameters), this information can be communicated to the master either as part of the alternate protocol, or optionally the information can be included as part of the memory map, allowing the slave to setup the protocol parameters using the normal operating protocol, and then invoking, by the slave, the alternate protocol to execute the operation already setup.

Bootload Protocol

Figure 21:
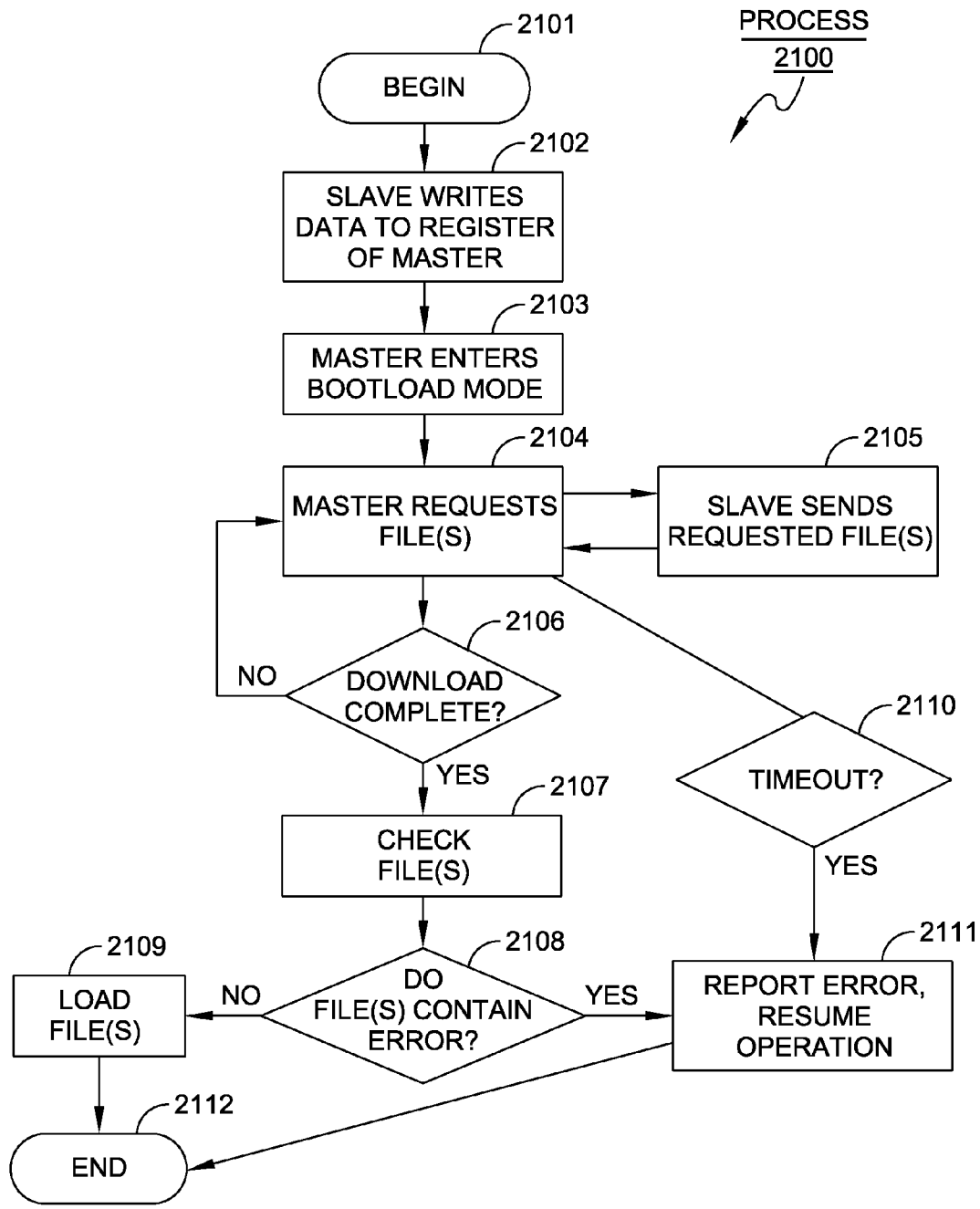
FIG. 21 is a process for performing a boot loading operation according to one embodiment of the present invention.

As discussed above with reference to FIG. 4, a master device may have the ability to support a bootload operation. The method of invoking the bootload operation may vary from application to application, but one possible method includes invoking the bootload operation upon an update of memory location of the master. FIG. 21 shows one process 2101 for performing a bootloading operation according to one embodiment of the present invention. At block 2101, process 2100 begins. At block 2102, a slave writes data to one or more registers of a master to begin the bootload operations. In one specific example, the master includes a series of registers that may be written to (e.g., by a slave), and when the value of the registers is a specific value, the master enters a bootload mode (e.g., at block 2103).

When in bootload mode, the master may wait until the slave sends a NAK requesting a row. As a response to the request, a BOOTLOAD_CHAR may be sent (e.g., character 0xF5) by the master to the slave. This character may signal the slave that the master is now in bootload mode. As a result, a bootload protocol may now be active.

According to one embodiment, the bootload protocol is an ASCII protocol that is used to send files to the master for self-reprogramming. These files may be, for example, ASCII hex, INTEL hex, binary, or any other format. The following is an example of responses from the master using INTEL hex files:

0—Request slave to send the entire hex file starting with address 0 of the file.

1—Request slave to send the hex file starting at address 0x1000 of the file.

2—Request slave to send the hex file starting at address 0x2000 of the file.

n—Request slave to start sending the hex file at address 0x1000*n (0<=n<=9).

A—Row has been acknowledged.

B—Programming is completed. Bootload protocol has been ended.

S—Checksum failure.

P—Programming failure. Bootload protocol has been ended.

In one example, the master requests that the slave send one or more files (or portions thereof) at block 2104. The slave responds to a message with an appropriate INTEL hex record associated with the requested file(s) at block 2105. If, at block 2110, it is determined that there is no response from the master within a predefined period (e.g., 1 second), the slave may assume the transfer is invalid and return to normal communication mode (e.g., at block 2111). Alternatively, the master may send additional requests for the file(s).

At block 2106, it is determined whether the download of the requested file(s) or portions thereof are complete. If so, the master may perform a check of the files prior to loading them into memory. To perform such a check, information may be included within each file to permit the file(s) to be checked by the master (e.g., at block 2107).

To this end, files to be bootloaded using the bootload protocol may be pre-processed. For example, a pre-processor of a system that creates the bootload files may place the records in order in the INTEL hex file, and place checksums in the file at two locations. The first location may be the 8-bit fletcher checksum of the first half of the file, and the second may be the 8-bit fletcher checksum of the entire file. The pre-processor must have knowledge of how the file is divided. The master may be capable of verifying the integrity of the file(s) (e.g., by using the checksums) prior to loading the file(s) into memory.

At block 2108, it is determined whether any of the downloaded file(s) contain one or more errors. For example, such a determination may be made using the error checking method described above. If there are no errors, the file(s) may be loaded into the memory of the master at block 2109. If there are errors, an error may be reported to the slave (or other system), and the master may resume normal operation without having loaded the file(s). At block 2112, process 2100 ends.

It should be appreciated that the invention is not limited to each of embodiments listed above and described herein, but rather, various embodiments of the invention may be practiced alone or in combination with other embodiments.

Having thus described several aspects of at least one embodiment of this invention, it is to be appreciated that various alterations, modifications and improvements will readily occur to those skilled in the art. Such alterations, modifications, and improvements are intended to be part of this disclosure, and are intended to be within the spirit and scope of the invention. Accordingly, the foregoing description is by way of example only.

What is claimed is:

1. A method for communicating between a first entity and a second entity, the first entity including a first memory storing a plurality of configurations of memory maps, the second entity including a second memory, the method comprising:

communicating, by the first entity, to the second entity, a first message initiating communication between the first entity and the second entity;

communicating, by the second entity, information stored in a public memory area of the second memory, the information identifying a data structure of a communication protocol used to communicate with the second entity and identifying a memory map of at least a portion of the second memory, the memory map including a header and indicating a storage location of configuration and performance data associated with the second entity, the header including an identifier of a configuration of the memory map and a model number of the second entity, the model number indicating capabilities of the second entity;

selecting, by the first entity, the configuration of the memory map from the plurality of configurations of memory maps using the identifier of the configuration of the memory map;

generating, by the first entity, a second message using the data structure, the configuration of the memory map and the model number; and communicating, by the first entity, the second message to the second entity.

2. The method according to claim 1, wherein the information includes length information identifying a length of a data packet, and wherein generating, by the first entity, the second message includes an act of generating the second message using a length indicated by the length information.

3. The method according to claim 1, wherein the information includes version information relating to the communication protocol used to communicate with the second entity, and wherein the first entity identifies a communication protocol type used to communicate with the second entity based on the version information.

4. The method according to claim 2, wherein the second entity sends, to the first entity, data messages having different lengths.

5. The method according to claim 4, wherein at least one of the data messages includes a write request, the write request including data necessary for performing the write request by the second entity.

6. The method according to claim 4, further comprising determining, for each of the data messages, a checksum, and transmitting the checksum with each of the data messages.

7. The method according to claim 6, wherein determining the checksum further comprises determining a Fletcher checksum.

8. The method according to claim 1, further comprising communicating, by the first entity, a request for access by a third entity to the second entity.

9. The method according to claim 8, further comprising translating, by the first entity, the request to a format associated with the second entity.

10. The method according to claim 1, wherein the information further comprises dimension information, and communicating, by the first entity, the second message to the second entity, further comprises accessing a portion of the memory map based upon the dimension information.

11. The method according to claim 1, wherein the information identifying the data structure further comprises version information, and communicating, by the first entity, the second message to the second entity using the information identifying the data structure, further comprises accessing a portion of a memory of the second entity based upon the version information.

12. The method according to claim 1, wherein the message initiating communication between the first entity and the second entity is an acknowledgement message, and the first entity is adapted to send a plurality of acknowledgement messages to the second entity.

13. The method according to claim 12, further comprising determining, by the second entity, based on a receipt of a predetermined number of acknowledgement messages that the first entity is in a state of initiating communications between the first entity and the second entity.

14. The method according to claim 13, wherein the acknowledgement messages are negative acknowledgement messages.

15. The method according to claim 13, further comprising maintaining, by the second entity, a count of acknowledgement messages received from the first entity.

16. The method according to claim 12, further comprising sending to the second entity, by the first entity, a plurality of consecutive acknowledgement messages.

17. The method according to claim 16, further comprising sending each of the plurality of consecutive acknowledgement messages after a timeout period.

18. The method according to claim 12, further comprising communicating, by the second entity, the information identifying the data structure of the communication protocol used to communicate with the second entity in response to receiving a predetermined one of the plurality of acknowledgement messages.

19. The method according to claim 18, wherein the information includes length information identifying a length of a data packet, and wherein communicating, by the first entity, the second message includes communicating the second message using a length indicated by the length information.

20. The method according to claim 1, wherein the second entity is at least one of an Uninterruptible Power Supply (UPS) and a UPS component.

21. The method according to claim 20, wherein the first entity is a manager of the at least one of the UPS and UPS component.

22. The method according to claim 1, wherein the second entity is a master entity and the first entity is a slave entity.

23. The method according to claim 1, wherein the first entity is a general purpose computer system.

24. The method according to claim 9, further comprising relaying the request without decoding any data relating to the request.

25. The method according to claim 1, wherein the second message includes a header portion and a data portion.

26. The method according to claim 25, further comprising receiving, by the first entity, the second message from a third entity, and relaying the second message to the second entity without decoding data located in the data portion.

27. The method according to claim 25, wherein the header portion includes version information.

28. The method according to claim 1, further comprising accessing, by the first entity, the public memory area.

29. The method according to claim 28, wherein the second entity comprises a key and a private memory area, and wherein the method further comprises accessing, by the first entity using the key, the private memory area of the second entity.

30. The method according to claim 29, further comprising authenticating, by the second entity, the first entity.

31. The method according to claim 1, further comprising sending, by the first entity, a signal to the second entity that causes the second entity to enter an alternate communication mode.

32. The method according to claim 31, further comprising performing a write request to the second entity causing the second entity to enter the alternate communication mode.

33. The method according to claim 32, further comprising writing a value to a register of the second entity to cause the second entity to enter the alternate communication mode.

34. The method according to claim 33, further comprising requesting, by the second entity, a boot file from the first entity.

35. The method according to claim 34, wherein the boot file includes checksum information, and the second entity checks the boot file with the checksum information prior to loading the boot file.

36. The method according to claim 35, wherein the checksum information includes a Fletcher checksum, and wherein the second entity checks at least a portion of the boot file with the Fletcher checksum prior to loading the boot file.

37. The method according to claim 29, wherein the key is determined based on information stored in the public memory area of the second entity.

38. The method according to claim 26, further comprising authenticating, by the first entity, to the second entity on behalf of the third entity.

39. The method according to claim 26, wherein the second entity includes a memory, and wherein the method further comprises transmitting, by the first entity, a portion of the memory to the third entity.

40. The method according to claim 39, wherein transmitting the portion of the memory further comprises sending the portion of the memory over a network to the third entity using a network transport protocol.

41. The method according to claim 40, wherein the network transport protocol is a version of Simple Network Management Protocol (SNMP) selected from the group comprising SNMPv1, SNMPv2c and SNMPv3.

42. The method according to claim 38, further comprising registering, by the first entity, the third entity as an authenticated entity.

43. The method according to claim 42, wherein the third entity includes network identification information, and wherein registering comprises storing the network identification information in a memory of the first entity.

44. The method according to claim 26, wherein the third entity is a client coupled to the first entity through a communication network.

45. The method according to claim 44, wherein relaying the second message includes sending the second message to the client over the communication network using a network transport protocol.

46. The method according to claim 45, wherein the network transport protocol is a version of Simple Network Management Protocol (SNMP) selected from the group comprising SNMPv1, SNMPv2c and SNMPv3.

47. The method according to claim 28, wherein the second entity includes a private memory area, and wherein the method further comprises determining, based on a portion of the public memory area, a key, and accessing the private memory area using the determined key.

* * * * *

UNITED STATES PATENT AND TRADEMARK OFFICE
CERTIFICATE OF CORRECTION

PATENT NO.        : 7,796,589 B2                                     Page 1 of 1
APPLICATION NO.   : 11/194746
DATED             : September 14, 2010
INVENTOR(S)       : Daniel C. Cohen et al.

It is certified that error appears in the above-identified patent and that said Letters Patent is hereby corrected as shown below:

Column 8, line 11, delete "uninterrtuptible" add "uninterruptible";
    Column 25, line 56, delete "HTFP" add "HTTP";

Column 38, claim 2, line 63, after the word "includes" and before the word "generating" delete "an act of".

Signed and Sealed this

Fourth Day of January, 2011

David J. Kappos
*Director of the United States Patent and Trademark Office*